United States Patent [19]
Dove

[11] Patent Number: 5,940,294
[45] Date of Patent: *Aug. 17, 1999

[54] SYSTEM FOR ASSISTING CONFIGURING A PROCESS CONTROL ENVIRONMENT

[75] Inventor: Andrew P. Dove, Austin, Tex.

[73] Assignee: Fisher-Rosemont Systems, Inc., Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/631,458

[22] Filed: Apr. 12, 1996

[51] Int. Cl.⁶ .................................................. G05B 19/42
[52] U.S. Cl. .................... 364/188; 364/131; 364/189; 364/191; 395/200.02; 395/200.05
[58] Field of Search .................... 364/191, 188, 364/157, 165, 164, 163, 138, 139, 551.01, 551.02, 552; 395/161, 155, 156, 159, 160, 200.02, 200.01, 200.05, 200.1; 365/226, 189, 185.33, 218, 230.01, 94, 900; 371/20.1, 11.2, 29.5, 32; 235/150.1; 370/85.1; 345/965, 966, 967, 968

[56] References Cited

U.S. PATENT DOCUMENTS

| | | | |
|---|---|---|---|
| Re. 33,162 | 2/1990 | Yoshida et al. ............................. | 364/492 |
| 3,665,172 | 5/1972 | Spaargaren et al. ................... | 235/150.1 |
| 4,006,464 | 2/1977 | Landell .................................. | 340/172.5 |
| 4,302,820 | 11/1981 | Struger et al. ............................ | 364/900 |
| 4,413,314 | 11/1983 | Slater et al. ............................... | 364/188 |
| 4,443,861 | 4/1984 | Slater ....................................... | 364/900 |
| 4,639,852 | 1/1987 | Motomiya ............................... | 364/138 |
| 4,641,269 | 2/1987 | Japenga et al. .......................... | 364/473 |
| 4,663,704 | 5/1987 | Jones et al. .............................. | 364/188 |
| 4,672,530 | 6/1987 | Schuss ..................................... | 364/133 |
| 4,682,158 | 7/1987 | Ito et al. .................................. | 340/679 |
| 4,704,676 | 11/1987 | Flanagan et al. ........................ | 364/146 |
| 5,121,318 | 6/1992 | Lipner et al. ............................ | 364/146 |
| 5,124,908 | 6/1992 | Broadbent .............................. | 364/188 |
| 5,129,087 | 7/1992 | Will ........................................ | 395/650 |
| 5,140,677 | 8/1992 | Fleming et al. .......................... | 395/159 |
| 5,164,894 | 11/1992 | Cunningham-Reid et al. ........ | 364/131 |
| 5,168,441 | 12/1992 | Onarheim et al. ...................... | 364/146 |
| 5,202,961 | 4/1993 | Mills et al. .............................. | 395/159 |

(List continued on next page.)

OTHER PUBLICATIONS

H.J. Beestermöller et al., "An online and offline programmable Multiple–Loop Controller for Distributed Systems", ©1994 IEEE, pp. 15–20.

Robert R. Lyons, "New Telemecanique Programmable Controllers Feature Multiple Programming Languages", Telemacanique, Arlington Heights, IL, Feb. 11, 1995.

Clifford J. Peshek et al., "Recent Developments and Future Trends in PLC Programming Languages and Programming Tools for Real–Time Control", IEEE Cement Industry Technical Conference, May 1993, Toronto, Canada, pp. 219–230.

C.K. Duffer et al., "High–Level Control Language Customizes Application Programs", Power Technologies, Inc., IEEE Computer Applications in Power, ©Apr. 1991, pp. 15–18.

John R. Gyorki, "PLC's drive standard buses", Machine Designs, May 11, 1995, pp. 83–90.

Moore Products Co., "Control System", POWER Apr. 1995, p. 11'4, vol. 139, No. 4, Copyright 1995, McGraw–Hill, Inc.

Moore Products Co., "Apacs Control System", POWER Jun., 1995, p. 81, vol. 139, No. 6, Copyright 1995, McGraw–Hill, Inc.

*Primary Examiner*—Paul P. Gordon
*Assistant Examiner*—Ramesh Patel
*Attorney, Agent, or Firm*—Skjerven, Morrill, MacPherson, Franklin, & Friel, L.L.P.; Stephen A. Terrile

[57] ABSTRACT

A configuration assistant system is disclosed which guides a user through configuring a process control environment via a sequence of screen presentations. The configuration assistant system advantageously enables a process control designer or user to quickly and easily configure a process control environment. The screen presentations may be contained within a plurality of instructional sections to further assist the process control designer in configuring the process control environment.

46 Claims, 27 Drawing Sheets

U.S. PATENT DOCUMENTS

| | | | |
|---|---|---|---|
| 5,251,125 | 10/1993 | Karnowski et al. | 364/189 |
| 5,307,346 | 4/1994 | Fieldhouse | 370/85.1 |
| 5,309,556 | 5/1994 | Sismilich | 395/161 |
| 5,371,895 | 12/1994 | Bristol | 395/800 |
| 5,377,315 | 12/1994 | Leggett | 395/140 |
| 5,384,910 | 1/1995 | Torres | 395/156 |
| 5,392,389 | 2/1995 | Fleming | 395/159 |
| 5,394,522 | 2/1995 | Sanchez-Frank et al. | 395/159 |
| 5,408,603 | 4/1995 | Van de Lavoir et al. | 395/161 |
| 5,420,977 | 5/1995 | Sztipanovits et al. | 395/160 |
| 5,426,732 | 6/1995 | Boies et al. | 395/161 |
| 5,428,734 | 6/1995 | Haynes et al. | 395/159 |
| 5,432,711 | 7/1995 | Jackson et al. | 364/514 |
| 5,437,007 | 7/1995 | Bailey et al. | 395/159 |
| 5,444,851 | 8/1995 | Woest | 395/200.1 |
| 5,452,201 | 9/1995 | Pieronek et al. | 364/188 |
| 5,459,825 | 10/1995 | Anderson et al. | 395/133 |
| 5,461,710 | 10/1995 | Bloomfield et al. | 395/161 |
| 5,467,264 | 11/1995 | Rauch et al. | 364/141 |
| 5,475,856 | 12/1995 | Kogge | 395/800 |
| 5,481,741 | 1/1996 | McKaskle et al. | 395/800 |
| 5,485,620 | 1/1996 | Sadre et al. | 395/700 |
| 5,491,791 | 2/1996 | Glowny et al. | 395/183.13 |
| 5,500,934 | 3/1996 | Austin et al. | 395/755 |
| 5,504,672 | 4/1996 | Hardiman et al. | 364/165 |
| 5,504,902 | 4/1996 | McGrath et al. | 395/700 |
| 5,513,095 | 4/1996 | Pajonk | 364/131 |
| 5,519,605 | 5/1996 | Cawlfield | 364/151 |
| 5,530,643 | 6/1996 | Hodorowski | 364/191 |
| 5,546,301 | 8/1996 | Agrawal et al. | 364/140 |
| 5,549,137 | 8/1996 | Lenz et al. | 137/486 |
| 5,550,980 | 8/1996 | Pascucci et al. | 395/200.05 |
| 5,559,691 | 9/1996 | Monta et al. | 364/188 |
| 5,566,320 | 10/1996 | Hubert | 395/474 |
| 5,576,946 | 11/1996 | Bender et al. | 364/146 |
| 5,594,858 | 1/1997 | Blevins | 395/326 |
| 5,621,871 | 4/1997 | Jaremko et al. | 395/141 |

FIG. 3B

Configuration Assistant

Introduction | Controllers | Control Hierarchy | PCs | Install | End

Navigate...
Tour...

You can edit the properties of a module or edit the attributes of a module.

Module properties include the following:
- The node the module is assigned to
- The execution period
- The priority
- The Primary, Detail, and Faceplate Display Module attributes include the control characteristics of the module.

What do you want to do now?

Area: 'FIC-101' Module 'area1'

○ Edit properties
◉ Edit configuration view

Edit Algorithm...

<Back    Next>    Help

SYSTEM FOR ASSISTING CONFIGURING A PROCESS CONTROL ENVIRONMENT

CROSS-REFERENCE TO RELATED APPLICATIONS

This application is related to copending application by Nixon et al., entitled "A Process Control System Using Standard Protocol Control of Standard Devices and Nonstandard Devices", filed on even date herewith U.S. patent application No. 08/631,862, now U.S. Pat. No. 5,828,857 which application is hereby incorporated by reference in its entirety, including any appendices and references thereto.

This application is related to copending application by Nixon et al., entitled "A Process Control System for Versatile Control of Multiple Process Devices of Various Device Types", filed on even date herewith (U.S. patent application Ser. No. 08/631,521), which application is hereby incorporated by reference in its entirety, including any appendices and references thereto.

This application is related to copending application by Nixon et al., entitled "A Process Control System for Monitoring and Displaying Diagnostic Information of Multiple Distributed Devices", filed on even date herewith (U.S. patent application Ser. No. 08/631,557 ), which application is hereby incorporated by reference in its entirety, including any appendices and references thereto.

This application is related to copending application by Nixon et al., entitled "Process Control System Including Automatic Sensing and Automatic Configuration of Devices", filed on even date herewith (U.S. patent application Ser. No. 08/631,519), which application is hereby incorporated by reference in its entirety, including any appendices and references thereto.

This application is related to copending application by Nixon et al., entitled "A Process Control System User Interface Including Selection of Multiple Control Languages", filed on even date herewith (U.S. patent application Ser. No. 08/631,517), which application is hereby incorporated by reference in its entirety, including any appendices and references thereto.

This application is related to copending application by Nixon et al., entitled "Process Control System Using a Control Strategy Implemented in a Layered Hierarchy of Control Modules", filed on even date herewith (U.S. patent application Ser. No. 08/631,520 ), which application is hereby incorporated by reference in its entirety, including any appendices and references thereto.

This application is related to copending application by Dove et al., entitled "System for Configuring a Process Control Environment", filed on even date herewith (U.S. patent application Ser. No. 08/631,863), which application is hereby incorporated by reference in its entirety, including any appendices and references thereto.

This application is related to copending application by Nixon et al., entitled "A Process Control System Using a Process Control Strategy Distributed Among Multiple Control Elements", filed on even date herewith (U.S. patent application Ser. No. 08/631,518), which application is hereby incorporated by reference in its entirety, including any appendices and references thereto.

This application is related to copending application by Nixon et al., entitled "Improved Process System ", filed on even date herewith (U.S Provisional Patent Application No. 60/017,700), which application is hereby incorporated by reference in its entirety including any appendices and references thereto.

BACKGROUND OF THE INVENTION

1. Field of the Invention

This invention relates to process monitoring and control systems. More specifically, the present invention relates to a system for assisting configuring a process monitoring and control system.

2. Description of the Related Art

Present-day process control systems use instruments, control devices and communication systems to monitor and manipulate control elements, such as valves and switches, to maintain at selected target values one or more process variables, including temperature, pressure, flow and the like. The process variables are selected and controlled to achieve a desired process objective, such as attaining the safe and efficient operation of machines and equipment utilized in the process. Process control systems have widespread application in the automation of industrial processes such as the processes used in chemical, petroleum, and manufacturing industries, for example.

Control of the process is often implemented using microprocessor-based controllers, computers or workstations which monitor the process by sending and receiving commands and data to hardware devices to control either a particular aspect of the process or the entire process as a whole. The specific process control functions that are implemented by software programs in these microprocessors, computers or workstations may be individually designed, modified or changed through programming while requiring no modifications to the hardware. For example, an engineer might cause a program to be written to have the controller read a fluid level from a level sensor in a tank, compare the tank level with a predetermined desired level, and then open or close a feed valve based on whether the read level was lower or higher than the predetermined, desired level. The parameters are easily changed by displaying a selected view of the process and then by modifying the program using the selected view. The engineer typically would change parameters by displaying and modifying an engineer's view of the process.

In addition to executing control processes, software programs also monitor and display a view of the processes, providing feedback in the form of an operator's display or view regarding the status of particular processes. The monitoring software programs also signal an alarm when a problem occurs. Some programs display instructions or suggestions to an operator when a problem occurs. The operator who is responsible for the control process needs to view the process from his point of view. A display or console is typically provided as the interface between the microprocessor based controller or computer performing the process control function and the operator and also between the programmer or engineer and the microprocessor based controller or computer performing the process control function.

Systems that perform, monitor, control, and feed back functions in process control environments are typically implemented by software written in high-level computer programming languages such as Basic, Fortran or C and executed on a computer or controller. These high-level languages, although effective for process control programming, are not usually used or understood by process engineers, maintenance engineers, control engineers, operators and supervisors. Higher level graphical display languages have been developed for such personnel, such as continuous function block and ladder logic. Thus each of the engineers, maintenance personnel, operators, lab personnel and the like, require a graphical view of the elements of the process control system that enables them to view the system in terms relevant to their responsibilities.

For example, a process control program might be written in Fortran and require two inputs, calculate the average of the inputs and produce an output value equal to the average of the two inputs. This program could be termed the AVERAGE function and may be invoked and referenced through a graphical display for the control engineers. A typical graphical display may consist of a rectangular block having two inputs, one output, and a label designating the block as AVERAGE. A different program may be used to create a graphical representation of this same function for an operator to view the average value. Before the system is delivered to the customer, these software programs are placed into a library of predefined user selectable features.

The programs are identified by function blocks. A user may then invoke a function and select the predefined graphical representations to create different views for the operator, engineer, etc. by selecting one of a plurality of function blocks from the library for use in defining a process control solution rather than having to develop a completely new program in Fortran, for example.

A group of standardized functions, each designated by an associated function block, may be stored in a control library. A designer equipped with such a library can design process control solutions by interconnecting, on a computer display screen, various functions or elements selected with the function blocks to perform particular tasks. The microprocessor or computer associates each of the functions or elements defined by the function blocks with predefined templates stored in the library and relates each of the program functions or elements to each other according to the interconnections desired by the designer. Ideally, a designer could design an entire process control program using graphical views of predefined functions without ever writing one line of code in Fortran or other high-level programming language.

One problem associated with the use of graphical views for process control programming is that existing systems allow only the equipment manufacturer, not a user of this equipment, to create his own control functions, along with associated graphical views, or modify the predefined functions within the provided library.

New process control functions are designed primarily by companies who sell design systems and not by the end users who may have a particular need for a function that is not a part of the standard set of functions supplied by the company. The standardized functions are contained within a control library furnished with the system to the end user. The end user must either utilize existing functions supplied with the design environment or rely on the company supplying the design environment to develop any desired particular customized function for them. If the designer is asked to modify the parameters of the engineer's view, then all other views using those parameters have to be rewritten and modified accordingly because the function program and view programs are often developed independently and are not part of an integrated development environment. Clearly, such procedure is very cumbersome, expensive, and time-consuming.

What is needed is a design environment that can easily be used, not only by a designer or manufacturer but also a user, to configure a solution to meet the specific needs of the user for developing process control functions.

SUMMARY OF THE INVENTION

It has been discovered that providing a configuration assistant system which guides a user through configuring a process control environment via a sequence of screen presentations advantageously enables a process control designer or user to quickly and easily configure a process control environment. The screen presentations may be contained within a plurality of instructional sections to further assist the process control designer in configuring the process control environment.

More specifically, in one aspect, the present invention relates to a method for configuring a process control environment. The process control environment includes a computer system having a processor coupled to a display device. The method includes the steps of providing a plurality of instructional sections, the instructional sections setting forth information relating to configuring a process control environment; presenting, on the display device, a sequence of configuration screen presentations relating to the instruction sections; and, guiding a user through the configuration of the process control environment via the sequence of configuration screen presentations.

In another aspect, the present invention relates to a system for configuring a process control environment. The system includes a computer system, which includes a processor coupled to a memory and a display device coupled to the processor, and a plurality of instructional sections coupled to the processor, the instructional sections setting forth information relating to configuring the process control environment. The system also includes means for presenting, on the display device, a sequence of configuration screen presentations relating to the instruction sections, and means for guiding a user through the configuration of the process control environment via the sequence of configuration screen presentations.

In another aspect, the invention relates to an article of manufacture which includes a non-volatile memory and a plurality of instructional sections stored in the non-volatile memory, the instructional sections setting forth information relating to configuring a process control environment. The article of manufacture also includes means for presenting, on the display device, a sequence of configuration screen presentations relating to the instruction sections, the means for presenting being stored in the non-volatile memory and means for guiding a user through the configuration of the process control environment via the sequence of configuration screen presentations, the means for guiding being stored in the non-volatile memory.

BRIEF DESCRIPTION OF THE DRAWINGS

The present invention may be better understood, and its numerous objects, features, and advantages made apparent to those skilled in the art by referencing the accompanying drawings.

FIG. 3B is an example of a screen presentation of the configuration assistant system.

DETAILED DESCRIPTION OF THE PREFERRED EMBODIMENTS

Figure 1:
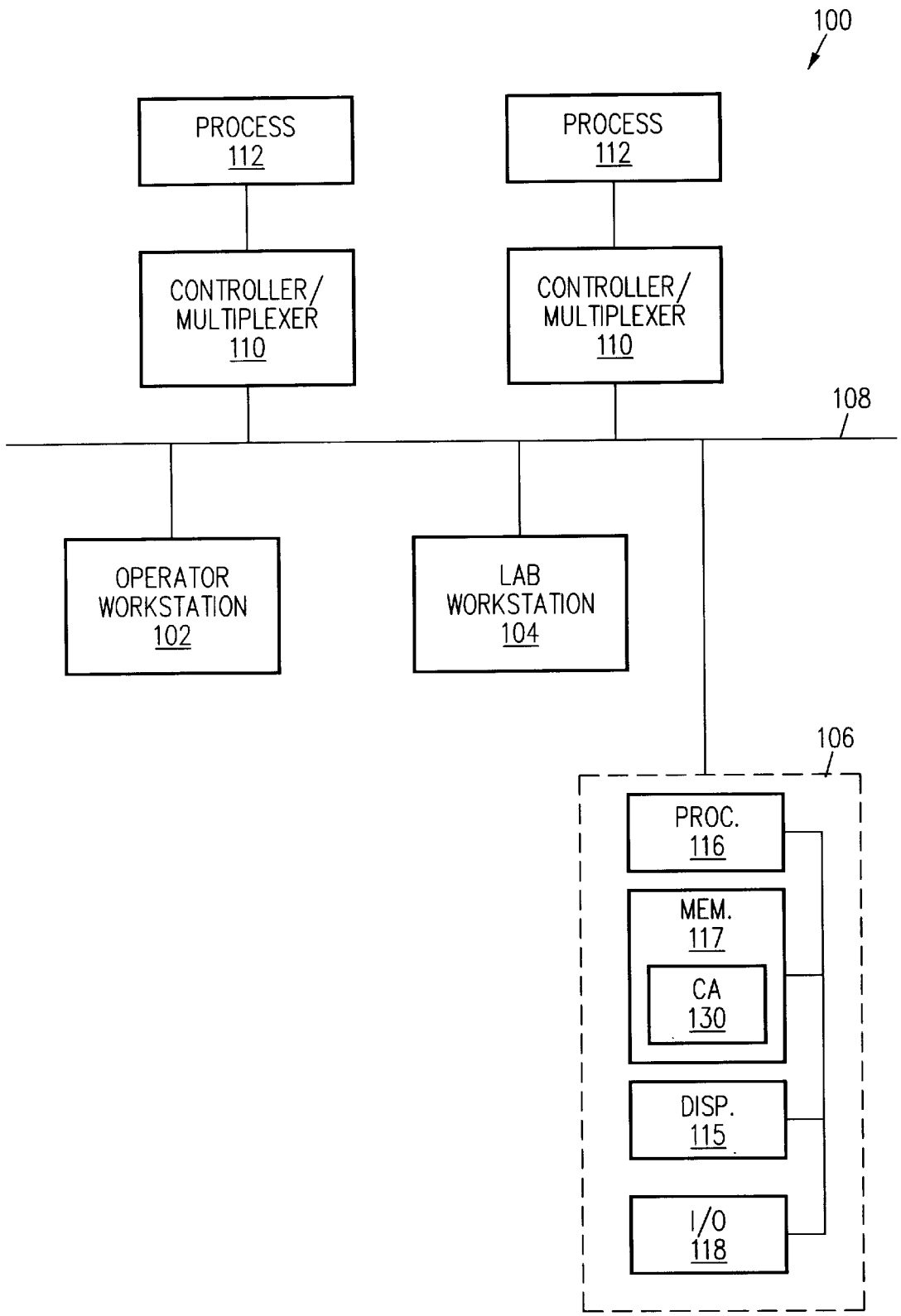
FIG. 1 is a schematic block diagram showing a workstation in accordance with a generalized embodiment of the present invention.

A process control environment 100 is shown in FIG. 1 and illustrates a control environment for implementing a digital control system, process controller or the like. The process control environment 100 includes an operator workstation 102 and an engineering workstation 106 electrically interconnected by a local area network ("LAN") 108, or other known communication link, for transferring and receiving data and control signals among the various workstations and a plurality of controller/multiplexers 110. Workstations 102 and 106 are, for example, computers which conform to the IBM compatible architecture. The workstations 102 and 106 are shown connected by the LAN 108 to a plurality of the controller/multiplexers 110 that electrically interface between the workstations and a plurality of processes 112. In multiple various embodiments, the LAN 108 includes a single workstation connected directly to a controller/multiplexer 110 or alternatively includes a plurality of workstations, for example two workstations 102 and 106, and many controller/multiplexers 110 depending upon the purposes and requirements of the process control environment 100. In some embodiments, a single process controller/multiplexer 110 controls several different processes 112 or alternatively controls a portion of a single process.

In the process control environment 100, a process control strategy is developed by creating a software control solution on the engineering workstation 106, for example, and transferring the solution via the LAN 108 to the operator workstation 102, lab workstation 104, and to controller/multiplexer 110 for execution. The operator workstation 102 supplies interface displays to the control/monitor strategy implemented in the controller/multiplexer 110 and communicates to one or more of the controller/multiplexers 110 to view the processes 112 and change control attribute values according to the requirements of the designed solution. The processes 112 are formed from one or more field devices, which may be smart field devices or conventional (non-smart) field devices.

In addition, the operator workstation 102 communicates visual and audio feedback to the operator regarding the status and conditions of the controlled processes 112. The engineering workstation 106 includes a processor 116, and a display 115 and one or more input/output or user-interface device 118 such as a keyboard, light pen and the like. The workstation 106 also includes a memory 117, which includes both volatile and non-volatile memory. The operator workstation 102 and other workstations (not shown) within the process control environment 100 include at least one central processing unit (not shown) which is electrically connected to a display (not shown) and a user-interface device (not shown) to allow interaction between a user and the processor.

The memory 117 includes a control program that executes on the processor 116 to implement control operations and functions of the process control environment 100. The memory 117 also includes a configuration assistant system 130 which is stored within the non-volatile memory when the configuration assistant system 130 is not in operation. The control program also includes an explorer portion which assists a user in navigating throughout the process control environment 100. The explorer portion of the control program is discussed in more detail in the application to Nixon et al. entitled "A Process Control System for Versatile Control of Multiple Process Devices of Various Device Types" having attorney docket number M-3923, which application is hereby incorporated by reference.

Configuration assistant system 130 assists a user in the process of creating a process configuration for a process control environment. Configuration assistant system 130 is designed to be understandable by a user who has no previous experience in configuring a process control environment. At a broad level, configuration assistant system 130 gathers information via a question and answer session which is conducted via a sequence of screen presentations which are presented on display 115 of, e.g., engineering workstation 102 and continuously writes this information to a database (not shown). The information in the database may then be directly downloaded to a controller 110 to configure the controller 110. In addition to writing the configuration information to the database, the configuration information obtained from the user during the operation of the configuration assistant system 130 is used to update the explorer portion of the control program.

Figure 2:
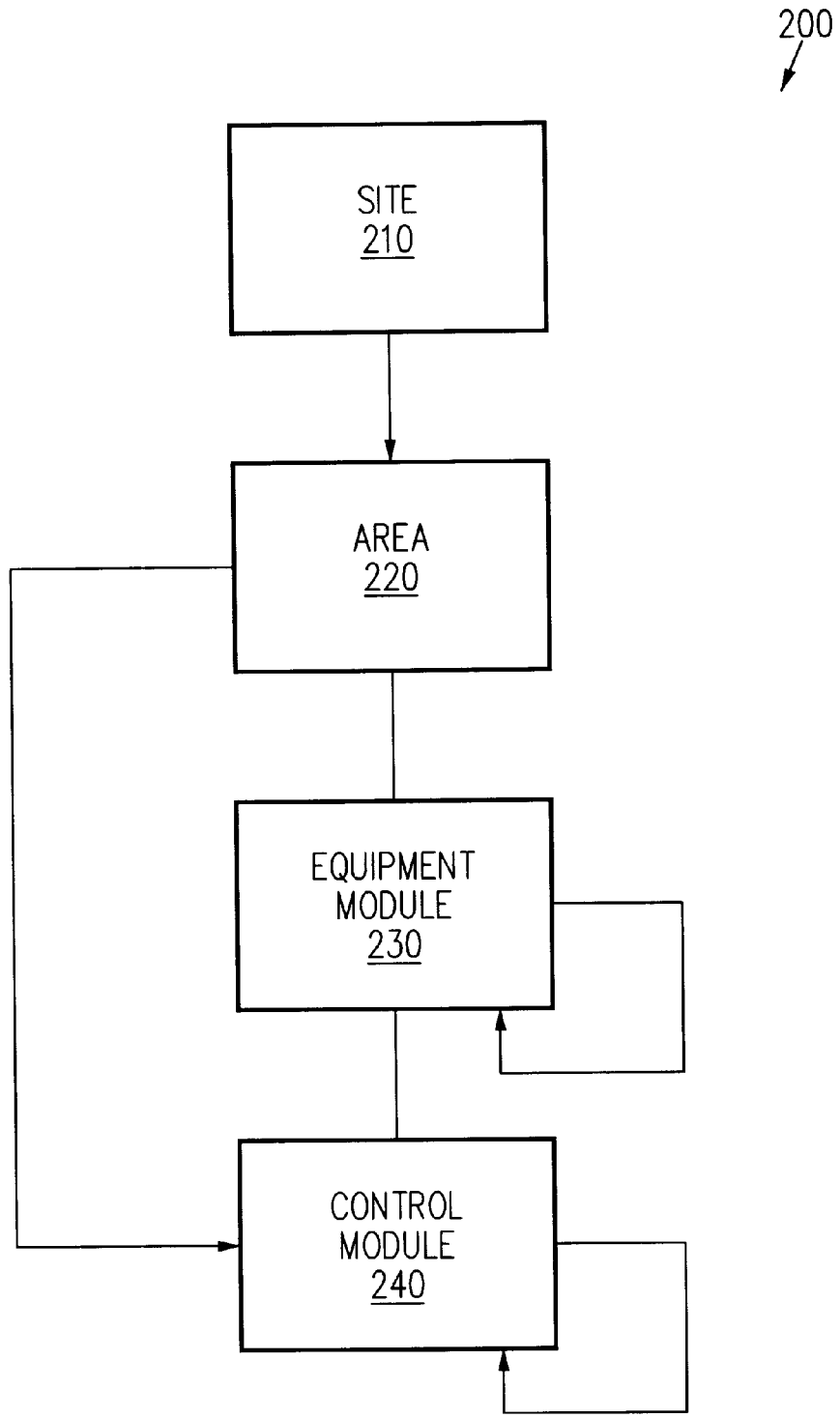
FIG. 2 is a schematic block diagram showing a hierarchical relationship among system objects of a configuration model in accordance with an embodiment of the present invention.

Referring to FIG. 2, a schematic block diagram illustrates a hierarchical relationship among system objects of a configuration model 200. The configuration model 200 includes many configuration aspects including control, I/O, process graphics, process equipment, alarms, history and events. The configuration model 200 also includes a device description and network topology layout.

The configuration model hierarchy 200 is defined for usage by a particular set of users for visualizing system object relationships and locations and for communicating or navigating maintenance information among various system objects. For example, one configuration model hierarchy 200, specifically a physical plant hierarchy, is defined for usage by maintenance engineers and technicians for visualizing physical plant relationships and locations and for communicating or navigating maintenance information among various instruments and equipment in a physical plant. An embodiment of a configuration model hierarchy 200 that forms a physical plant hierarchy supports a subset of the SP88 physical equipment standard hierarchy and includes a configuration model site 210, one or more physical plant areas 220, equipment modules 230 and control modules 240.

The configuration model hierarchy 200 is defined for a single process site 210 which is divided into one or more named physical plant areas 220 that are defined within the configuration model hierarchy 200. The physical plant areas 220 optionally contain tagged modules, each of which is uniquely instantiated within the configuration model hierarchy 200. A physical plant area 220 optionally contains one or more equipment modules 230. An equipment module 230 optionally and hierarchically contains other equipment modules 230, control modules 240 and function blocks. An equipment module 230 includes and is controlled by a control template that is created according to one of a number of different graphical process control programming languages including continuous function block, ladder logic, or sequential function charting ("SFC"). The configuration model hierarchy 200 optionally contains one or more control modules 240. A control module 240 is contained in an object such as a physical plant area 220, an equipment module 230 or another control module 240. A control module 240 optionally contains objects such as other control modules 240 or function blocks.

User Interface Aspects of Configuration Assistant System

Figure 3A:
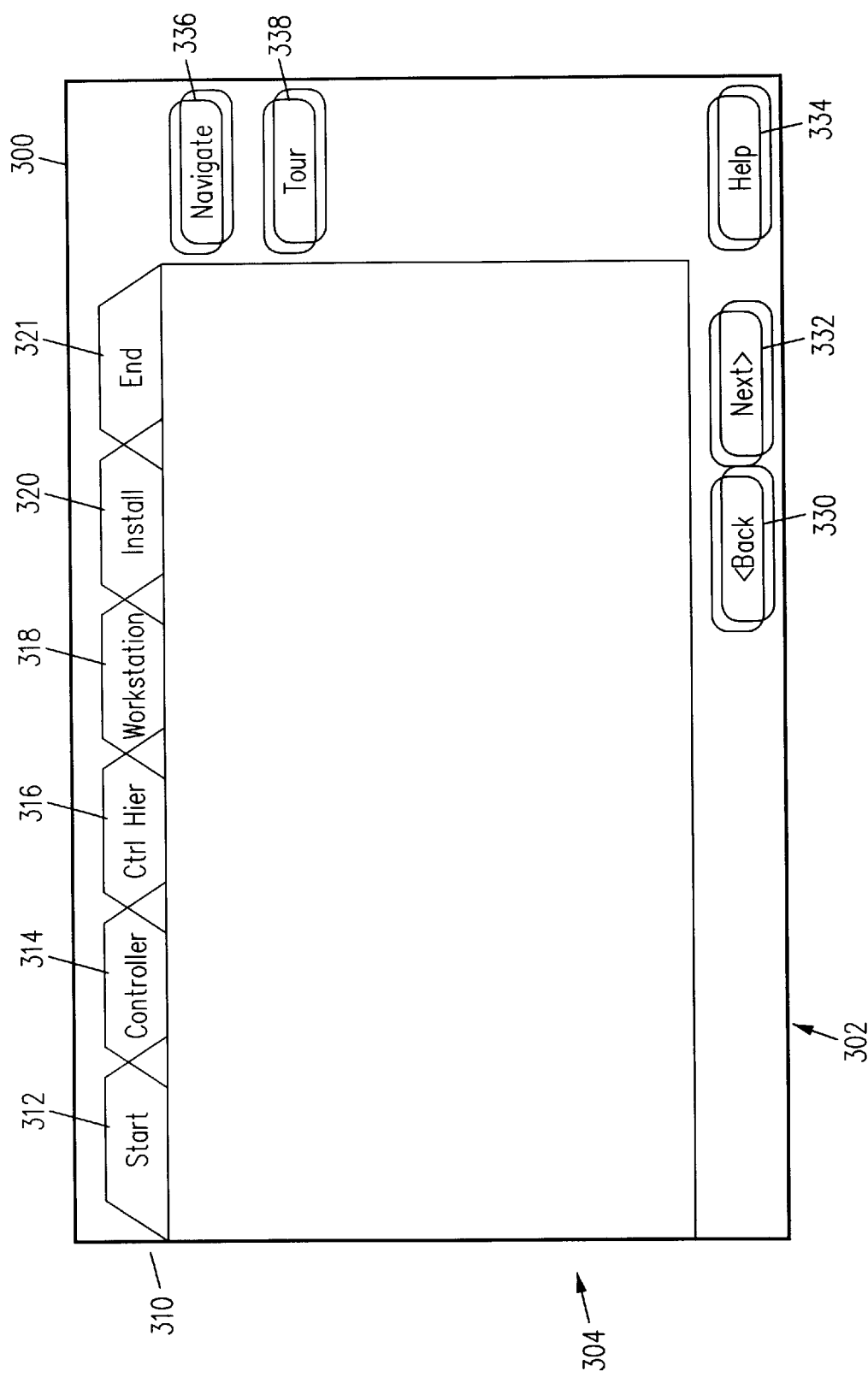
FIG. 3A is a block diagram of the screen presentation of the configuration assistant system in accordance with the present invention.

Referring to FIGS. 3A and 3B, each screen presentation generated by configuration assistant system 130 includes a navigation portion 302 as well as a screen specific portion 304. The navigation portion 302 includes navigation tabs 310 which allow a user to access particular sections of the configuration assistant system 300. For example, when configuration assistant 300 is first accessed, start navigation tab 312 is actuated. Additional navigation tabs include controller navigation tab 314, controller hierarchy navigation tab 316, workstation navigation tab 318, install navigation tab 320 and end navigation tab 321 which provide access to the controller section, controller hierarchy section, workstation section, install and the end section of configuration assistant system 130, respectively.

The navigation portion 302 also includes a variety of buttons which provide navigation functions. More specifically, navigation portion 302 includes Back button 330, Next button 332, Help button 334 and Navigate button 336. The Back button 332 takes the user to the previous screen presentation in strict historical order. The Next button 334 takes the user to the screen presentation appropriate for the selections that are made on the current screen presentation. The help button 334 accesses the help contents for the configuration assistant system. The navigate button 336 brings up a list of screen presentations already viewed. When configuration assistant system 130 is accessed, it first takes default values of the process control environment 100 where they are sufficient to get the system running. If the elements of the environment 100 are not in auto internet protocol (IP) address assignment mode, then the environment is set to the auto IP address assignment mode and the user is notified.

The layout of the screen specific portion 304 of each screen presentation conforms to one of four general layout categories: informational screen layout, Choice screen layout, Selection screen layout and Data Entry screen Layout.

Figure 4A:
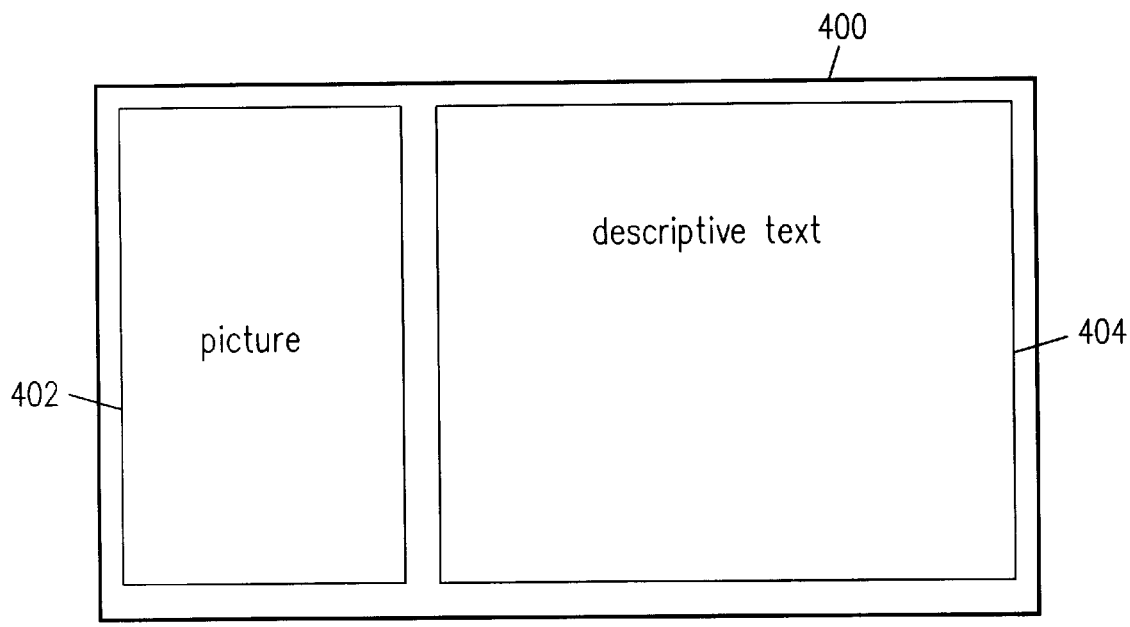
FIG. 4A is a block diagram of a screen presentation of the Information screen presentation of the configuration assistant system in accordance with the present invention.
Figure 4B:
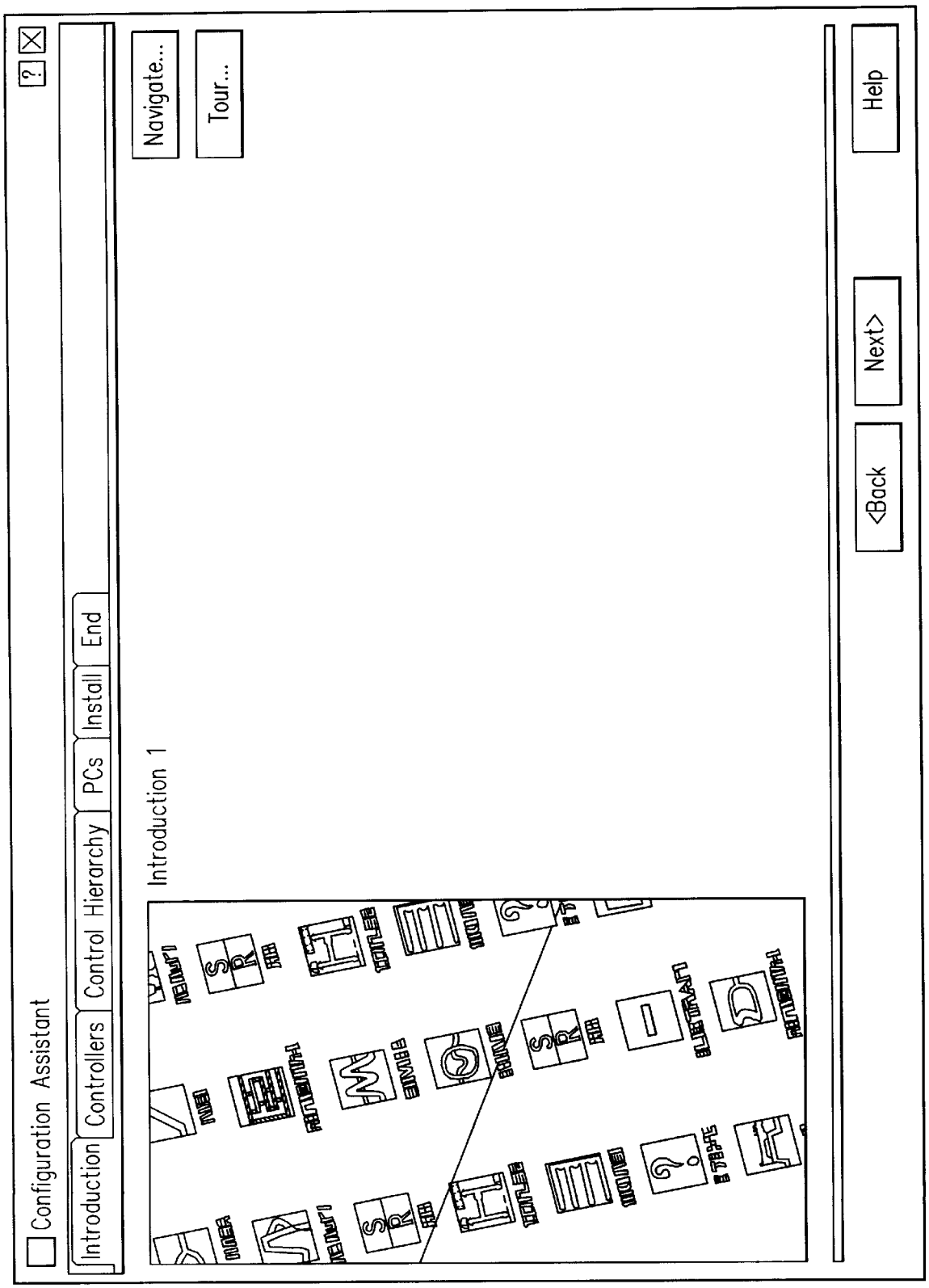
FIG. 4B is an example of an Information screen presentation.

More specifically, referring to FIG. 4A, information screen layout 400 includes a picture portion 402 as well as a descriptive text portion 404. The picture portion 402 includes a bit mapped picture which is context specific. This picture orients a user to the context of the function that the user is performing and also improves the appearance of the screen presentation. The descriptive text portion 404 provides a textual explanation to step a user through the configuration assistant system 130. FIG. 4B shows an example of an information screen presentation.

Figure 5A:
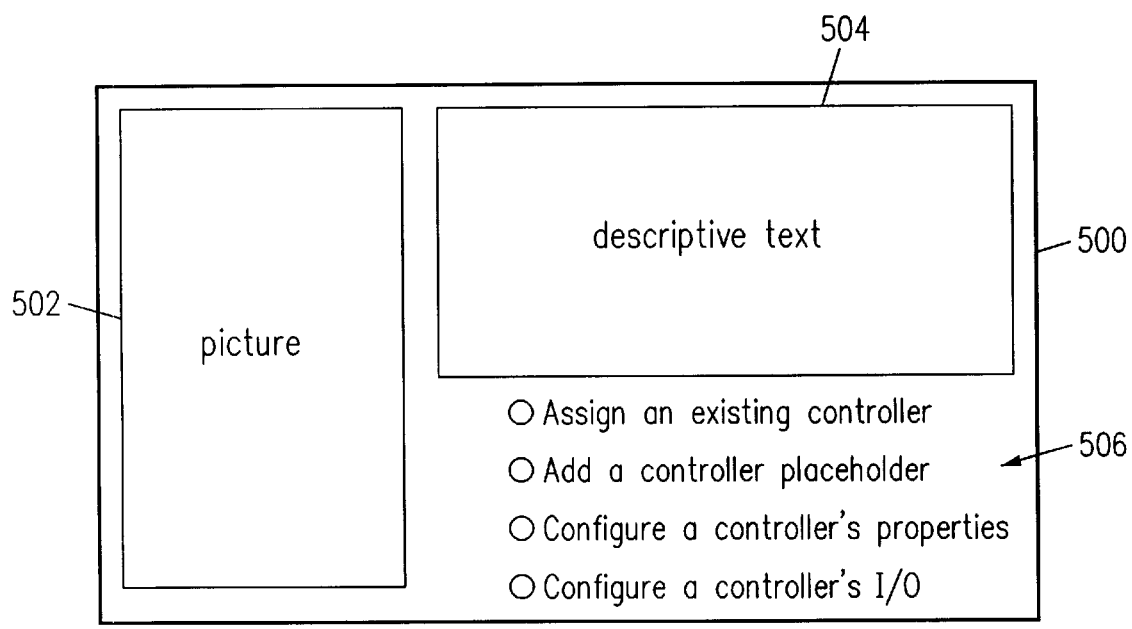
FIG. 5A is a block diagram of a screen presentation of a choice screen presentation of the configuration assistant system in accordance with the present invention.
Figure 5B:
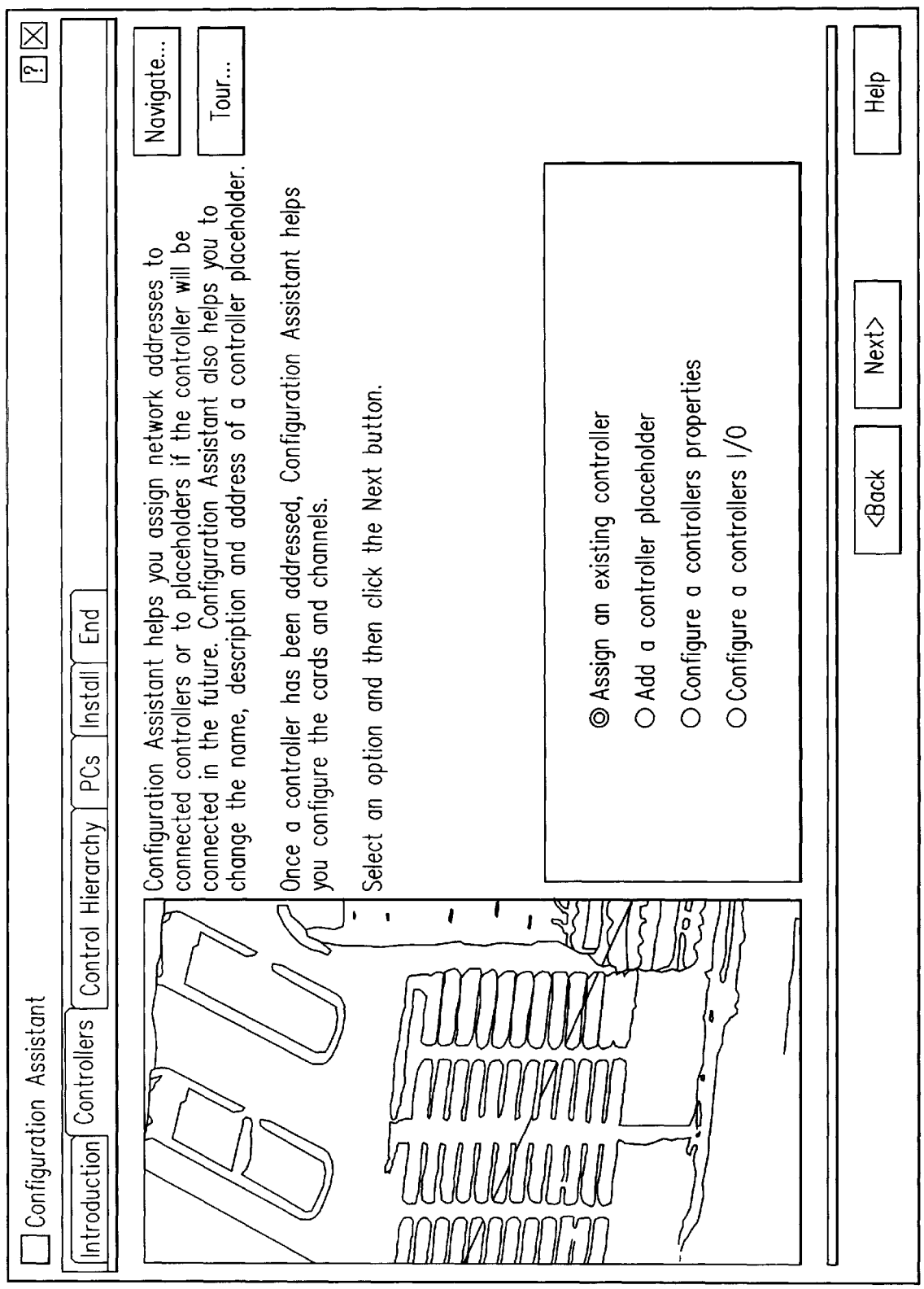
FIG. 5B is an example of a choice screen presentation.

Referring to FIG. 5A, choice screen layout 500 includes a picture portion 502, a descriptive text portion 504 and a radio button portion 506. The picture portion 502 and descriptive text portion 504 perform the same function as in the information screen layout. The radio button portion 506 set forth radio button that may be actuated to chose a particular selection. FIG. 5B shows an example of a choice screen presentation.

Figure 6A:
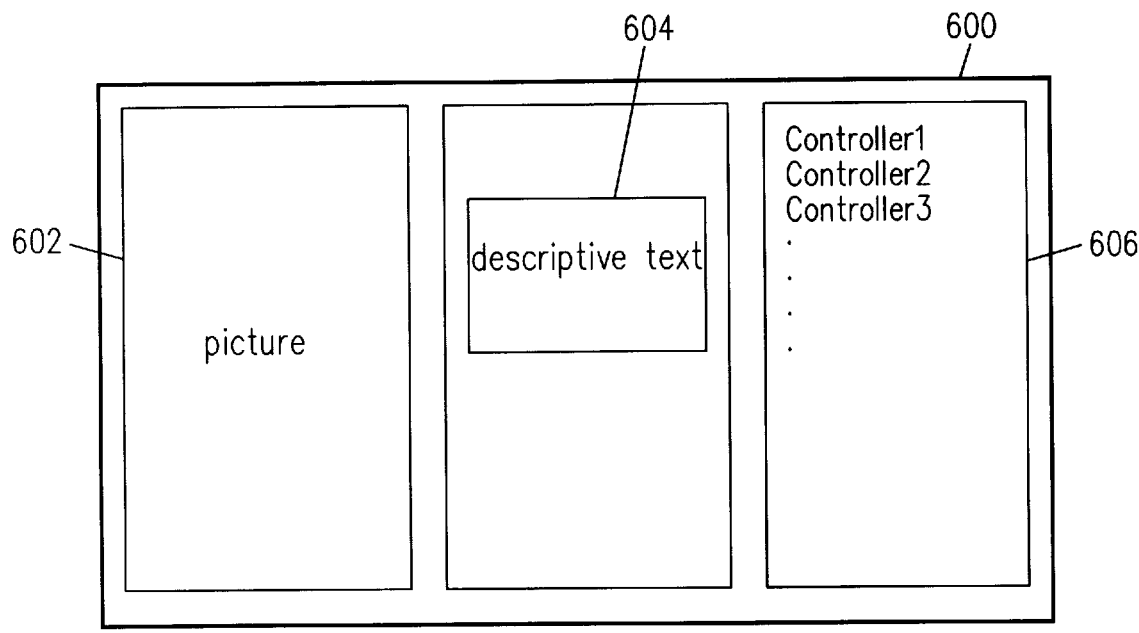
FIG. 6A is a block diagram of a screen presentation of a Selection screen presentation of the configuration assistant system in accordance with the present invention.
Figure 6B:
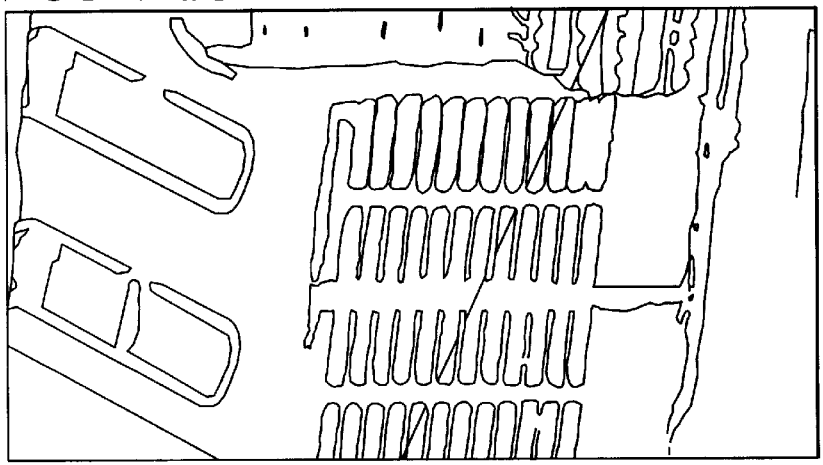
FIG. 6B is an example of a Selection screen presentation.

Referring to FIG. 6A, select screen presentation 600 includes picture portion 602, descriptive text portion 604 and list selection portion 606. The picture portion 602 and descriptive text portion 604 perform the same function as in the information screen layout and choice screen layout. The list selection portion 606 provides a list of choices from which a user may select one or more choices. FIG. 6B shows an example of a select screen presentation.

Figure 7A:
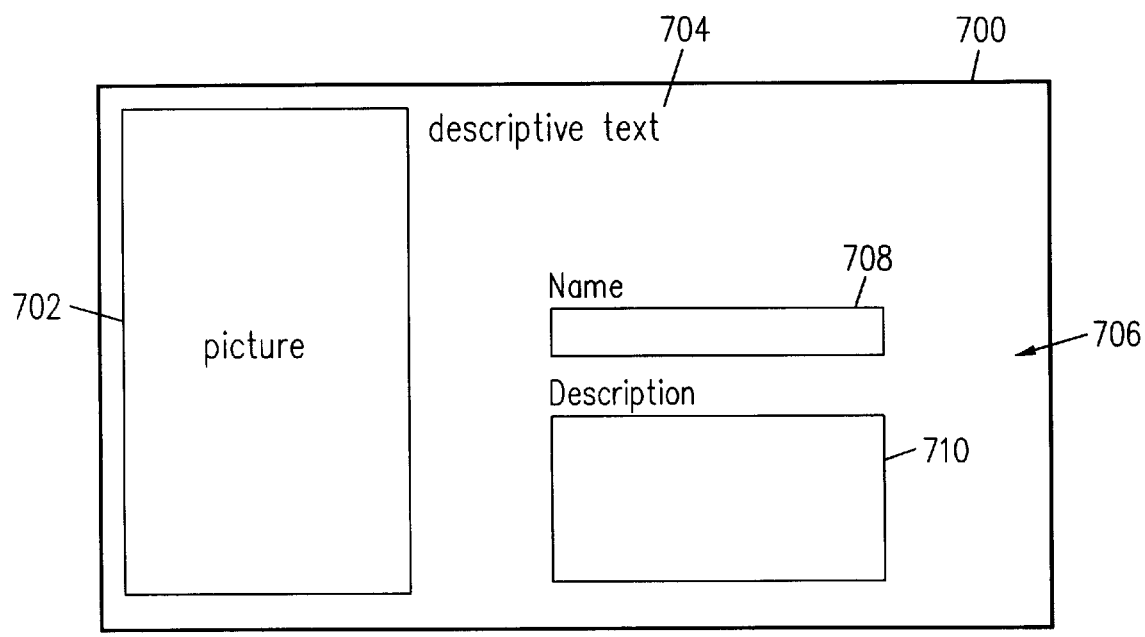
FIG. 7A is a block diagram of a screen presentation of a Data Entry screen presentation of the configuration assistant system in accordance with the present invention.
Figure 7B:
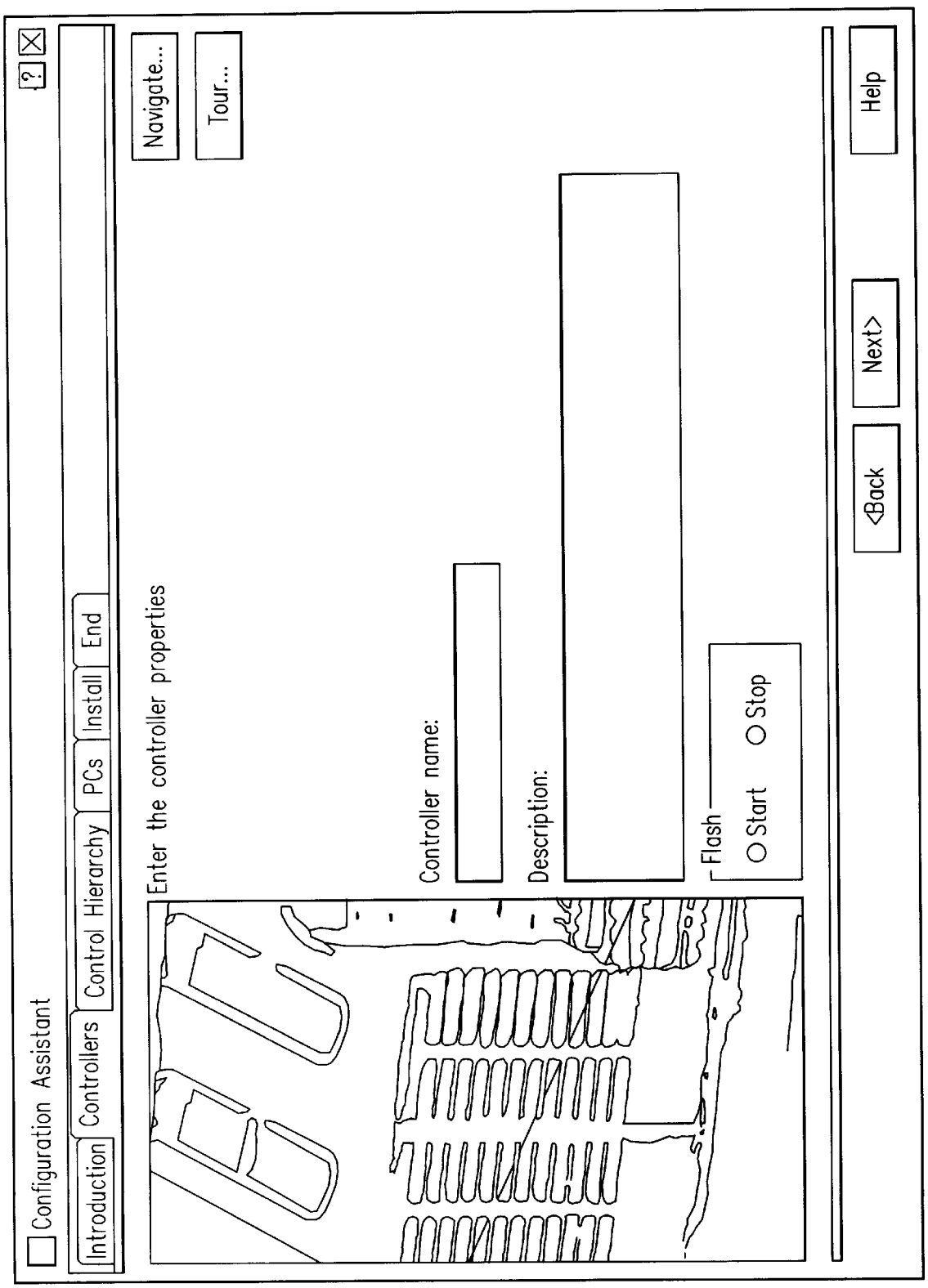
FIG. 7B is an example of a Data Entry screen presentation.

Referring to FIG. 7A, Data Entry screen presentation 700 includes picture portion 702 and descriptive text portion 704 as well as an information entry portion 706. The information entry portion 706 includes fields such as name field 708 and description field 710 into which information is entered by a user. The picture portion 702 and descriptive text portion 704 perform the same function as in the information screen layout, choice screen layout and select screen layout. FIG. 7B shows an example of a Data Entry screen presentation.

Implementation of Configuration Assistant System

The process control environment 100 and more specifically configuration assistant system 130 is implemented using an object-oriented framework. An object-oriented framework uses object-oriented concepts such as class hierarchies, object states and object behavior. These concepts, which are briefly discussed below, are well known in the art. The preferred object-oriented framework is written using object-oriented programming languages, such as the C++ programming language, which is well-known in the art.

The building block of an object-oriented framework is an object. An object is defined by a state and a behavior. The state of an object is set forth by fields of the object. The behavior of an object is set forth by methods of the object. Each object is an instance of a class, which provides a template for the object. A class defines zero or more fields and zero or more methods.

Fields are data structures which contain information defining a portion of the state of an object. Objects which are instances of the same class have the same fields. However, the particular information contained within the fields of the objects can vary from object to object. Each field can contain information that is direct, such as an integer value, or indirect, such as a reference to another object.

A method is a collection of computer instructions which can be executed in processor 116 by computer system software. The instructions of a method are executed, i.e., the method is performed, when software requests that the object for which the method is defined perform the method. A method can be performed by any object that is a member of the class that includes the method. The particular object performing the method is the responder or the responding object. When performing the method, the responder consumes one or more arguments, i.e., input data, and produces zero or one result, i.e., an object returned as output data. The methods for a particular object define the behavior of that object.

Classes of an object-oriented framework are organized in a class hierarchy. In a class hierarchy, a class inherits the fields and methods which are defined by the superclasses of that class. Additionally, the fields and methods defined by a class are inherited by any subclasses of the class. Ie., an instance of a subclass includes the fields defined by the superclass and can perform the methods defined by the superclass. Accordingly, when a method of an object is called, the method that is accessed may be defined in the class of which the object is a member or in any one of the superclasses of the class of which the object is a member. When a method of an object is called, process control environment 100 selects the method to run by examining the class of the object and, if necessary, any superclasses of the object.

A subclass may override or supersede a method definition which is inherited from a superclass to enhance or change the behavior of the subclass. However, a subclass may not supersede the signature of the method. The signature of a method includes the method's identifier, the number and type of arguments, whether a result is returned, and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes may define fields and methods which are inherited by subclasses of the abstract classes. The subclasses of an abstract class may be other abstract classes; however, ultimately, within the class hierarchy, the subclasses are concrete classes.

All classes defined in the disclosed preferred embodiment, except for mix-in classes which are described below, are subclasses of a class, CObject. Thus, each class that is described herein and which is not a mix-in class inherits the methods and fields of class CObject.

More specifically, configuration assistant system 130 is implemented using the Foundation classes version 4.0 of the Microsoft developers kit for Visual C++ for Windows NT version 3.51. Specifically, the dialog classes descend from the CDialog class of the Foundation classes, the section classes descend from the CObject classes of the Foundation classes. Configuration assistant system 130 also includes Class CHcaApp (not shown) which descends from the foundation class CWinApp (not shown) and relates to the windowing features of the configuration assistant system.

Figure 8:
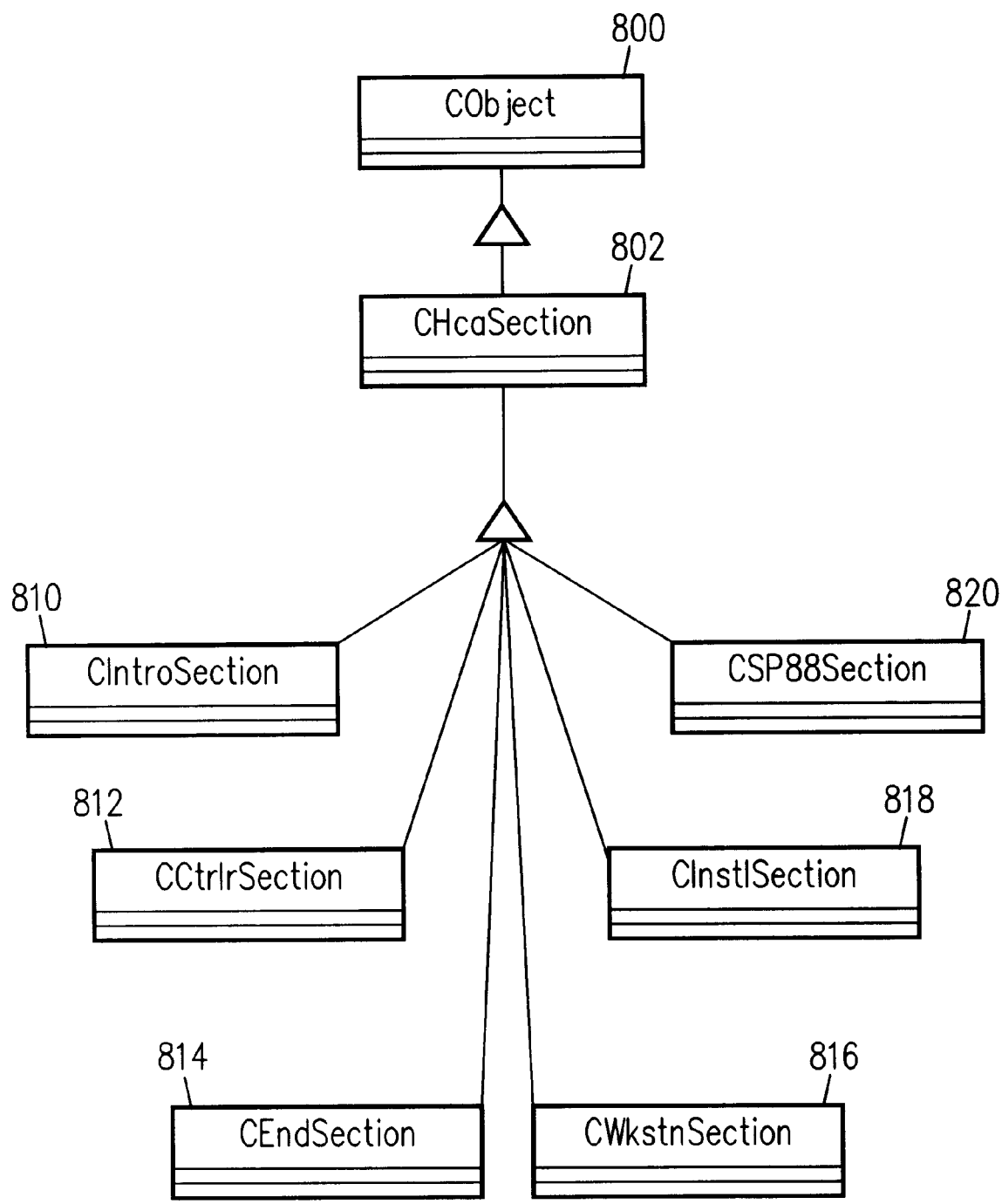
FIG. 8 is a block diagram showing the class hierarchy of the configuration assistant system classes that descend from class CObject.

Referring to FIG. 8, the class hierarchy for the instructional section classes which descend from class CObject 800 class are shown. More specifically, class CHcaSection 802 descends from the Foundation class CObject 800. Class CHcaSection 802 is a virtual base class which controls which screen to present to the user at a given time.

Section classes CIntroSection 810, CCtrlrSection 812, CEndSection 814, CWkstnSection 816, CInstlSection 818 and CSP88Section 820 descend from class CHcaSection 802. Class CCtrlrSection 812 controls presentation of the controller section and determines which screen is presented at a given time. Class CEndSection 814 controls presentation of the end section and determines which screen is presented at a given time. Class CWkstnSection 816 controls the workstation section and determines which screen to present at a given time. Class CInstlSection 818 controls the install section and determines which screen presentation should be presented at a given time. CIntroSection 819 controls the introduction section and determines which screen presentation to present at a given time. Class CSP88Section 820 controls the control hierarchy section and determines which screen presentation to present at a given time.

Referring to FIGS. 9A–9D, the class hierarchy for the dialog classes which descend from class CDialog 900 are shown. The class CHawkDialog 902 descends from class CDialog 900. The class CHcaDialogBase 904 descends from class CHawkDialog 902. Class CHcaDlg 903 also descends from class CHawkDialog 902 and is associated with class CHcaDialogBase 904.

Class CHcaDlg 903 is the parent dialog for all the screens in the configuration assistant system 130. Class CHcaDlg 903 presents the screens presentations using class CHcaSection 802 based helper classes and controls the tabs 312–320 for accessing the sections as well as the next button 332, back button 330, help button 334, and navigate button 336. Class CHcaDialogBaseD 904 is a base class for controlling the nested dialogs in the configuration assistant system 130.

A plurality of configuration assistant system dialog classes descend from class CHcaDialogBase 904. These configuration assistant system dialog classes are generally grouped into a plurality of generalizations which are generally related to the various instructional sections. One class which descends from class CHcadialogBase 904 and is not within one of the generalization groups is class CNaviagateD 905. Class CNavigateD 905 presents a list of screen presentations in historical order so that the user can access a previously viewed screen presentation.

Figure 9A:
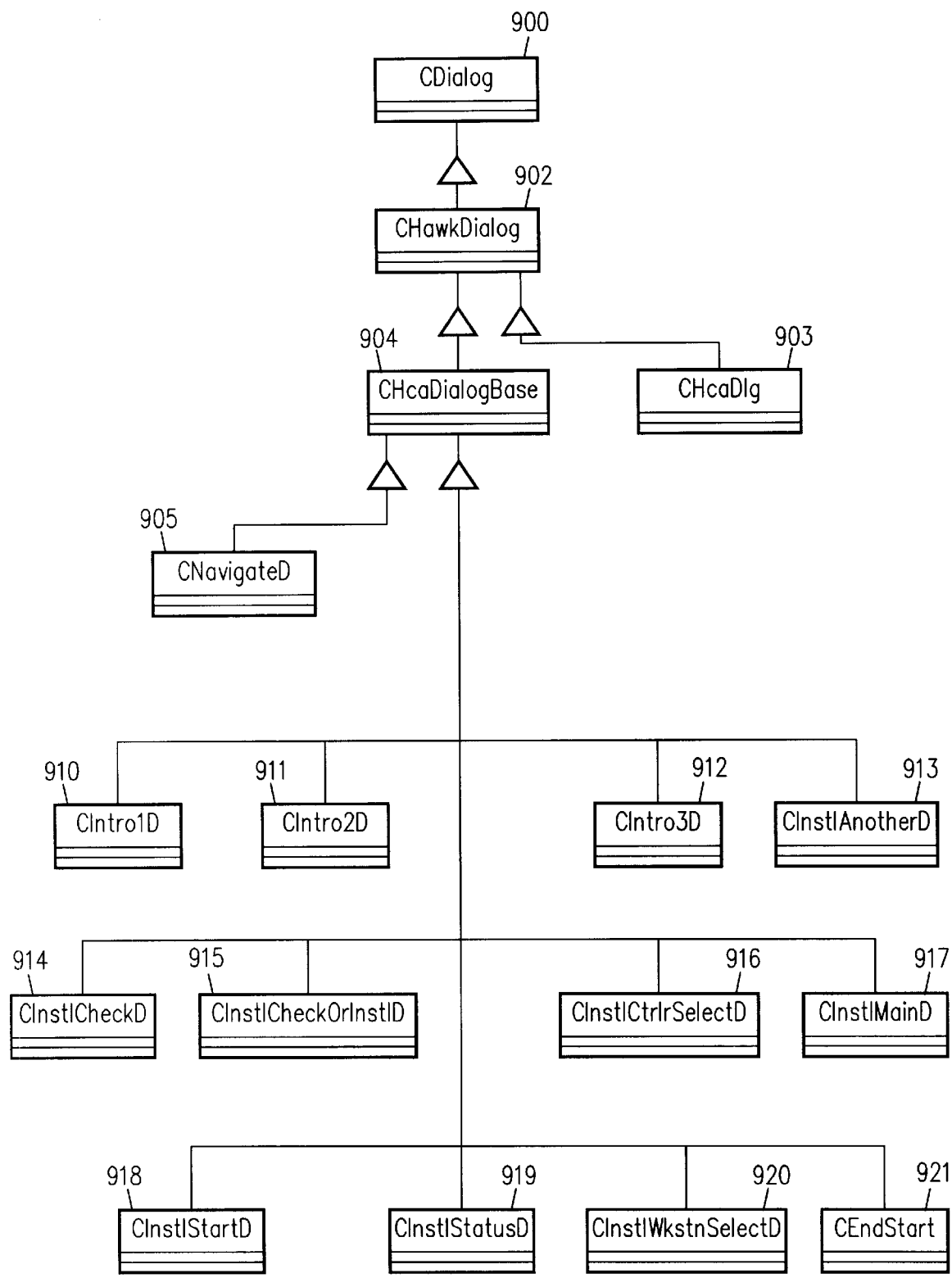
FIGS. 9A–9D are block diagrams showing the class hierarchy of the configuration assistant classes that descend from class CDialog.

More specifically, referring to FIG. 9A, configuration assistant system dialog classes which are within the introduction, install and end generalization and which descend from class CHcaDialogBase 904 include classes CIntro1D 910, CIntro2D 911, CIntro3D 912, CInstlAnotherD 913, CInstlCheckD 914, CInstlCheckOrInstfD 915, CInstlCtrlrSelectD 916, CinstlMaindD 917, CInstlStard) 918, CInstlStatusD 919, CInstlWkstnSelectD 920 and CEndStart 921.

More specifically, Class CIntro1D 910 presents the first page of the introduction section. Class CIntro2D 911 presents the second page of the introduction section. Class CIntro3D 912 presents the third page of the introduction section. Class CInstlAnotherD 913 asks whether the user wishes to install another node in the system. Cass CMsWlCheckD 914 presents the results of checking the database to see if everything that is required to run the configuration assistant system 130 is stored within the database and presents any problems found to the user. Class CInstlCheckD 914 also presents a "fix it" button (not shown) which transfers the user to the screen presentation most likely to fix the problem. Class CInstCheckOrInstID 915 asks whether the user wishes to check the configuration that has been generated by the configuration assistant system 130 before installing it, or whether the configuration should be installed without being checked. Class CInstlCtrlSelectD 916 presents a list of controllers to the user and asks which one to install. Class ClnstlMainD 917 presents the main screen presentation for the install section; the main screen presentation for the install section presents the starting choices for installing the system. Class CInstdStart) 918 is the start screen presentation for the install section; this start screen presentation introduces what will be done in this section. Class CInstlStatusD 919 presents the status of the install process as it is occurring. Class CInstlWkstnSelectD 920 presents a list of workstations to the user and asks which workstation the user wishes to install. Class CEndStartD 921 presents the start screen for the end section; this screen presentation congratulates the user and tells the user that the process of configuring the system is complete.

Figure 9B:
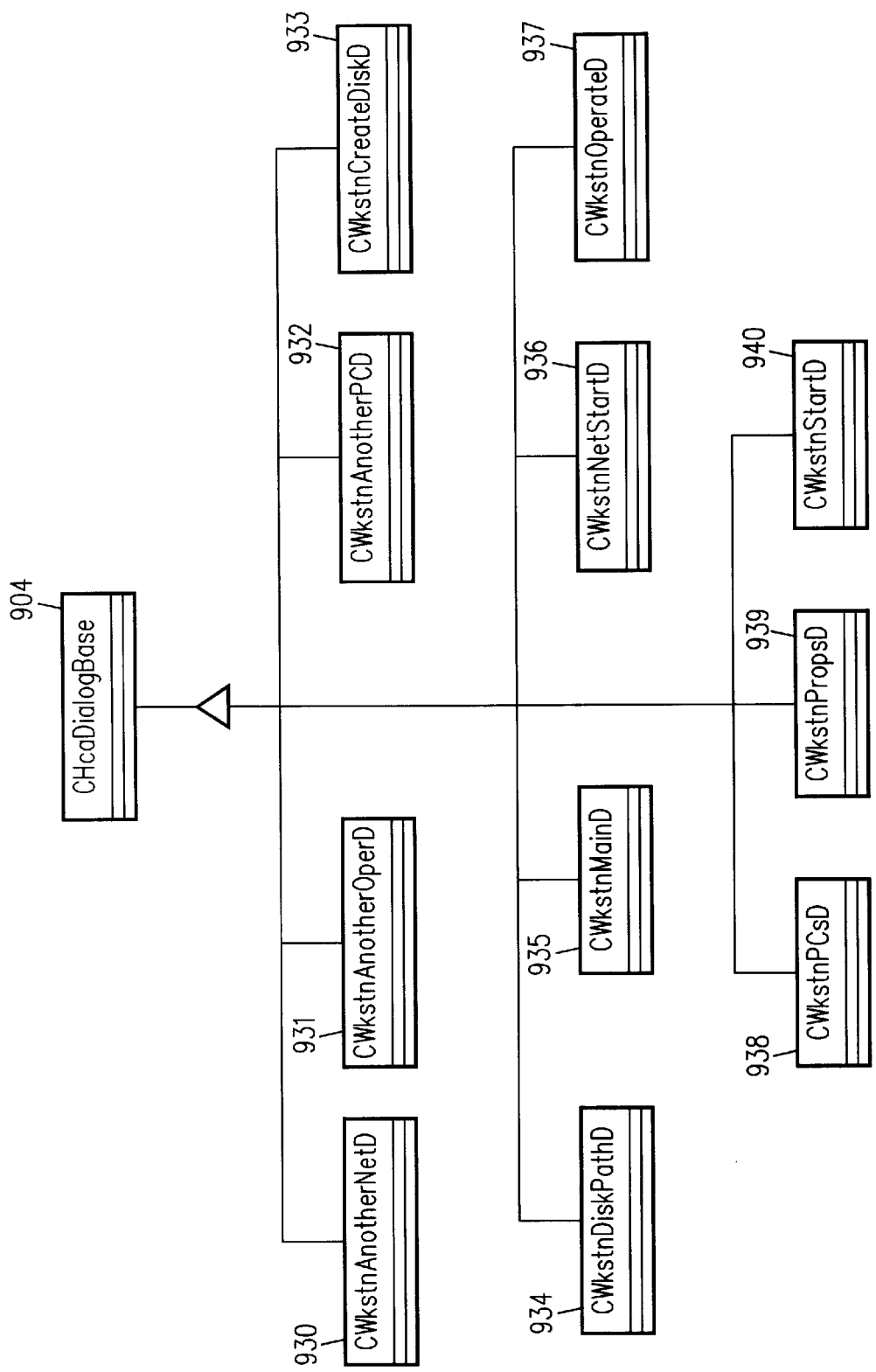

Referring to FIG. 9B, configuration assistant system dialog classes which are within the workstation generalization and which descend from class CHcaDialogBase 904 include CWkstnAnotherNetD 930, CWkstnAnotherOperD 931, CWksnAnotherPCD 932, CWkstnCreateDiskD 933, CWkstnDiskPathD 934, CWkstnMainD 935, CWkstnNetStartD 936, CWkstnOperateD 937, CWkstnPCsD 938, CWkstnPropsD 939 and CWkstnStartD 940.

More specifically, Class CWkstnAnotherNetD 930 asks whether the user wants to add a personal computer (PC), i.e., a workstation, modify a PC, or if the user is done editing PCs. Class CWkstnAnotherOperD 931 asks whether the user wishes to configure the operating capabilities of another PC. Class CWkstnAnotherPCD 932 asks whether the user wishes to configure another PC. Class CWkstnCreateDiskD 933 asks whether the user wishes to create a configuration diskette. Class CWkstnDiskPathD 934 allows the user to enter the path to the configuration file. Class CWkstnMainD 935 presents the main screen for the workstation section; the main screen provides the starting choices for configuring workstations. Class CWkstnPropsD 939 allows the user to enter the properties of the workstation. Class CWkstNetStartD 936 asks whether the user wishes to add a PC or modify a PC. Class CWkOperateD 937 presents a list of areas and asks the user to select which areas can be operated from the present PC. Class CWkstnPCsD 938 presents a list of PCs and asks the user which one the user wishes to configure. Class CWkstnStartD 940 is the start screen for the workstation section; the start screen for the workstation section introduces what will be done in this section.

Figure 9C:
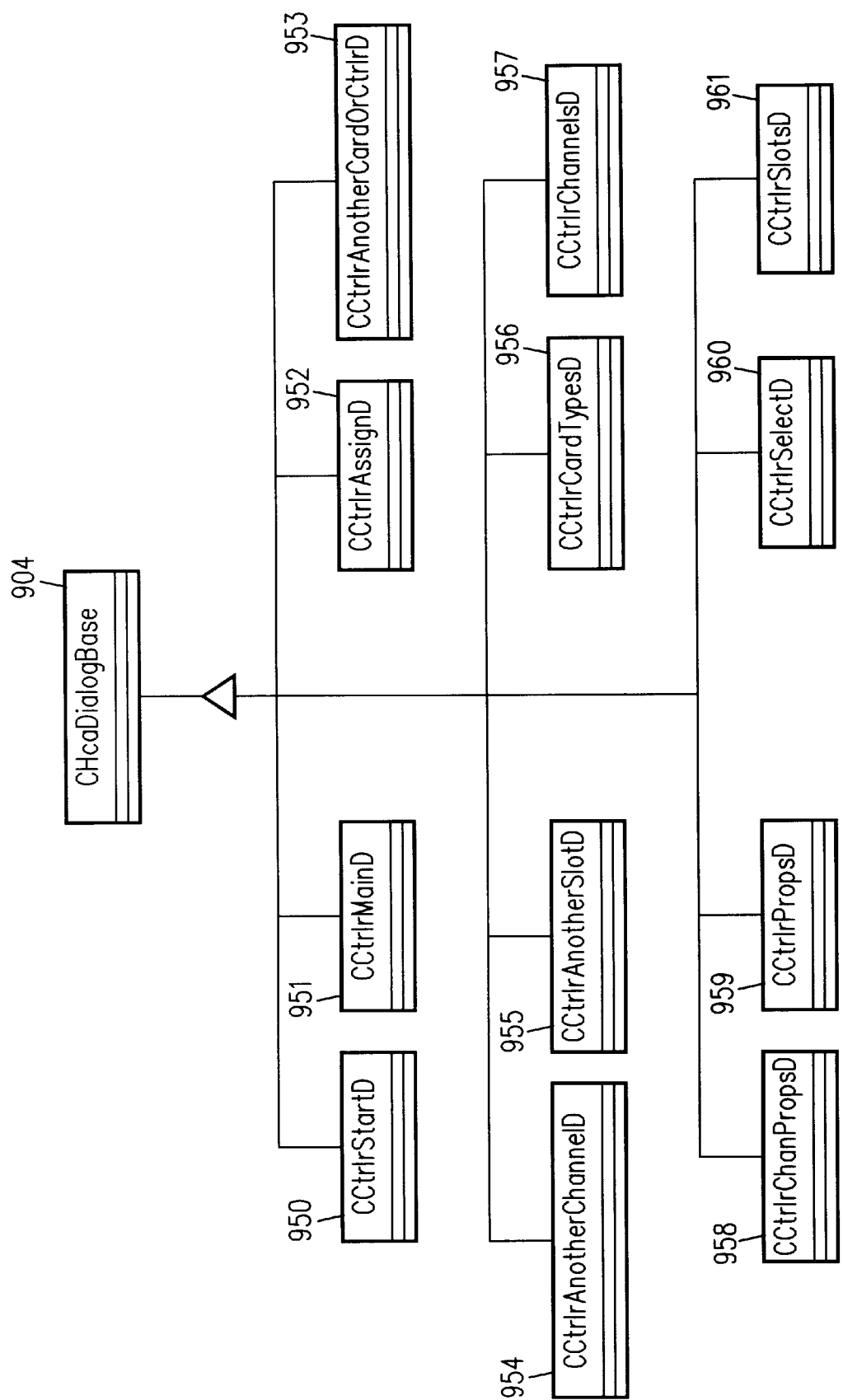

Referring to FIG. 9C, configuration assistant system dialog classes which are within the controller generalization and which descend from class CHcaDialogBase 904 include CCtrlrStartD 950, CCtrlrMaindD 951, CCtrlrAssignD 952, CCtrlrAnotherCardOrCtrlrD 953, CCtrlrAnotherChannelD 954, CCtrlrAnotherSlotD 955, CCtrlrCardTypesD 956, CCtrlrChannelsD 957, CCtrlrCharPropsD 958, CCtrlrPropsD 959, CCtrlrSelectD 960 and CCtrlrSlotsD 961.

Class CCtrlrStartD 950 presents the start screen presentation for the controller section; this screen presentation introduces what functions will be accomplished in the controller section. Class CCtrlrMainD 951 presents the main screen presentation for the controller section; the main screen presentation presents the staring choices for configuring controllers 110. Class CCtrlrAssignD 952 presents a list of auto-sensed controllers 110 to allow the user to select one of the controllers 110 to be configured. Class CtrlrAnotherCardOrCtrl 953 asks whether the user wishes to configure another card on the present controller or another controller. Class CCtrlAnotherChannel 954 asks whether the user wishes to configure another channel on the present card. Class CCtrlrAnotherSlotD 955 asks whether the user wishes to configure another slot in the present controller. Class CCtrlrCardTypesD 956 presents a list of card types to allow the user to select the type of card present in a slot. Class CCtrhrChannelsD 957 presents a list of channels or ports for a given card and allows the user to select one of the channels or ports to set the properties thereof. Class CCtrlrChanPropsD 958 allows the user to enter the properties of a given channel or port of a card. Class CCtriPropaD 959 allows the user to enter the properties of a controller, these properties include name and description. Class CCtrlrSelectD 960 allows the user to select a controller from a list for purposes of configuring the controller 110. Class CCtrlrSlotsD 961 presents a list of slots in a controller to allow the user to configure the card types present in the slots.

Figure 9D:
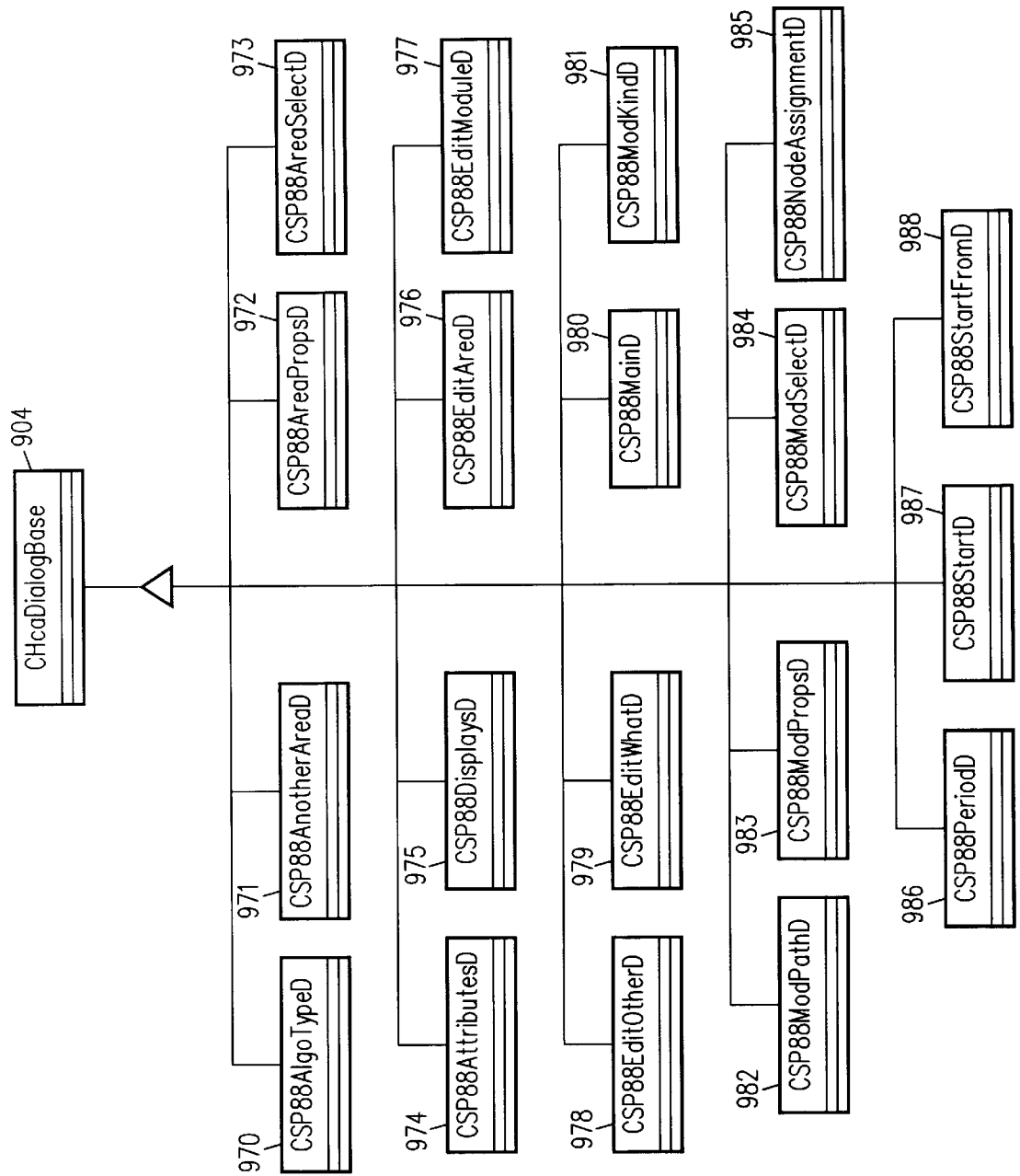

Referring to FIG. 9D, configuration assistant system dialog classes which are within the controller hierarchy generalization and which descend from class CHcaDialogBase 904 include CSP88AlgoTypeD 970, CSP88AnotherAreaD 971, CSP88AreaPropsD 972, CSP88AreaSelectD 973, CSP88AttributesD 974, CSP88DisplaysD 975, DSP88EditAreaD 976, SCP88EditModuleD 977, CSP88EditOtherD 978, CSP88EditWhatD 979, CSP88MaindD 980, CSP88ModKindD 981 CSP88ModePathD 982, CSPModPropsD 983, CSP88ModSelectD 984, CSP88NodeAssignmentD 985, CSP88PeriodD 986, CSP88Stara) 987 and CSP88StartromD 988.

More specifically, Class CSP88AlgoTypeD 970 queries the user regarding the work type algorithm to use in the module being created. Class CSP88AnotherAreaD 971 queries the user whether the user wishes to configure another area or configure the modules in the present area. Class CSP88AreaPropsD 972 allows the user to enter the properties of an area including the name and description of the area. Class CSP88AreaSelectD 973 allows the user to select an area to be modified. Class CSP88AttributesD 974 presents a list of attributes for a module and allows the user to edit the attributes using a standard attribute editing dialog. Class CSP88DisplaysD 975 allows the user to enter the primary, detail and instrument displays associated with a module. Class CSP88EditAreaD 976 asks whether the user wishes to add or rename an area. Class CSP88EditModuleD 977 asks whether the user wishes to add a module or modify a module. Class CSP88EditOtherD 978 asks whether the user wishes to configure another part of the present module, configure another module, or configure another area. Class CSP88EditWhatD 979 asks whether the user wishes to configure the properties of a module or the attributes. Class CSP88MainD 980 presents the main screen for the control hierarchy section; the main screen for the control hierarchy section presents the starting choices for editing the control hierarchy. Class CSP88ModPathD 982 allows the user to enter a path to a module from which the module presently being created will be derived. Class CSP88ModPropsD 983 allows the user to enter the properties of a module. Class CSP88ModSelectD 984 presents a list of modules from which list the user may select one. Class CSP88NodeAssignment 985 asks the user for the name of the node to which the present module will be assigned. Class CSP88PeriodD 986 allows the user to enter the execution period and priority of a module. Class CSP88StartD 987 presents start screen for the control hierarchy section; the start screen for the control hierarchy section introduces the section. Class CSP88StartFromD 988 asks whether the user wants to create a module from scratch or from another module.

Operation of Configuration Assistant System

Figure 10:
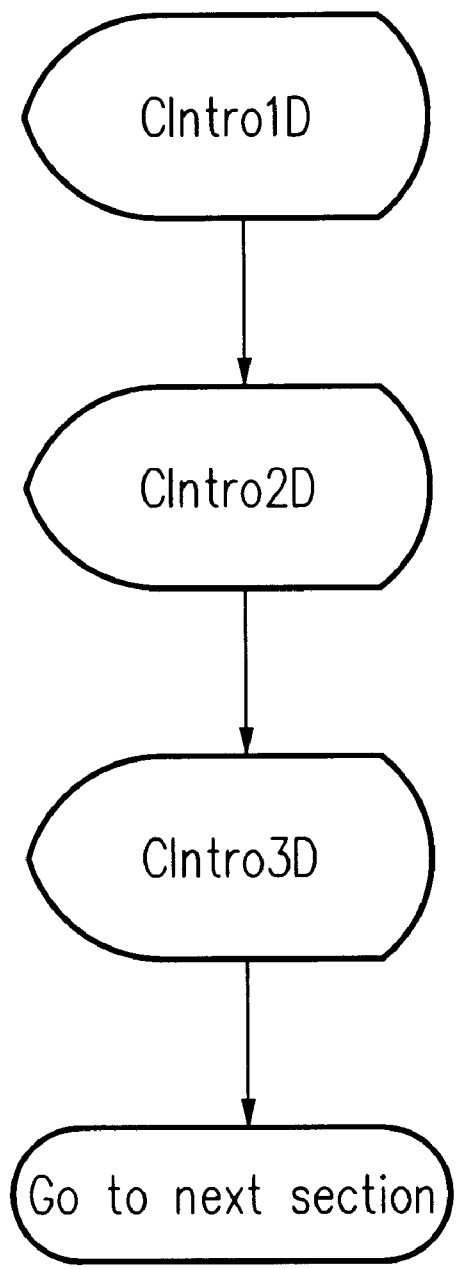
FIG. 10 is a flow chart showing the operation of the introduction section of the configuration assistant system.
Figure 11A:
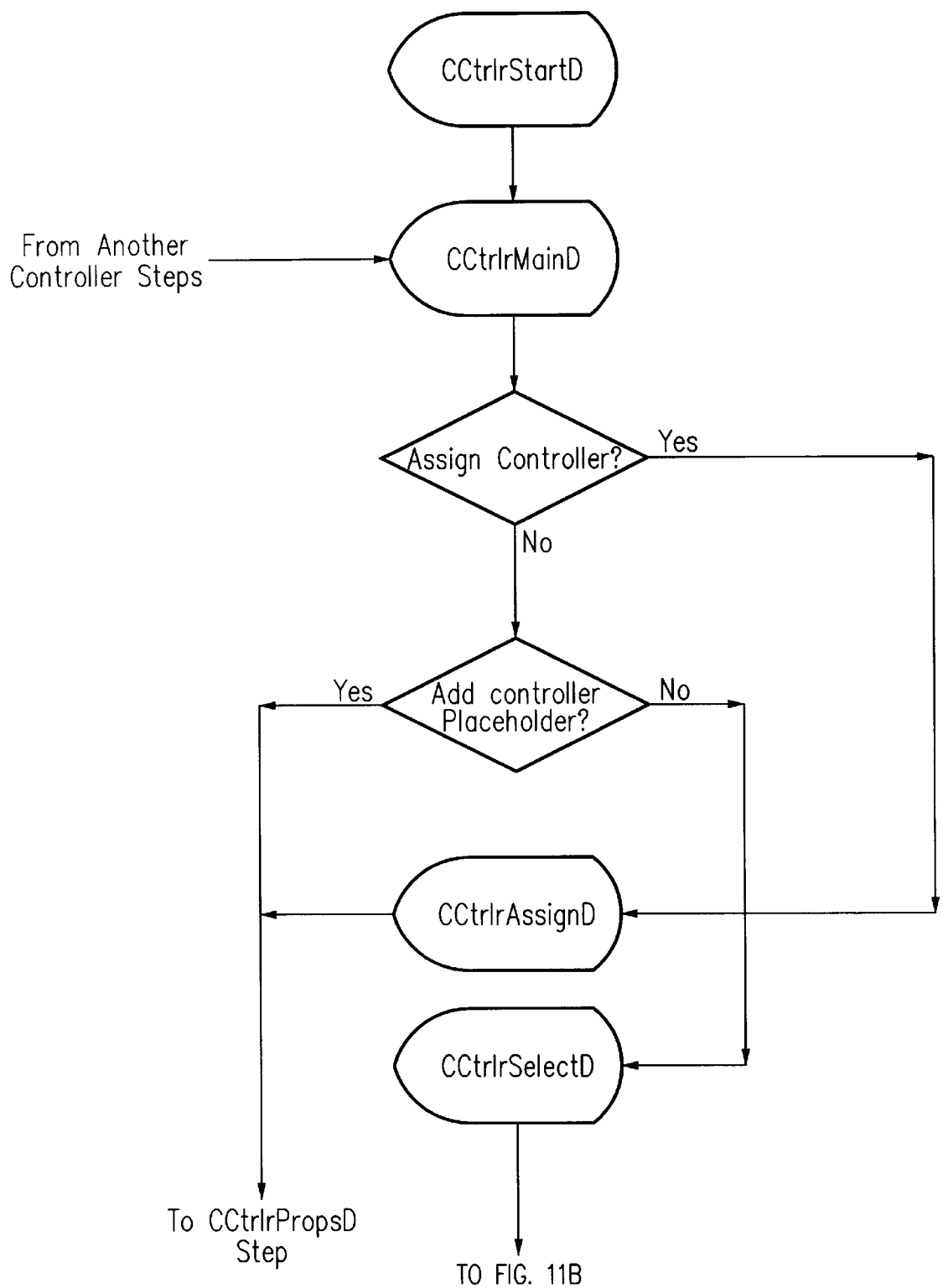
FIGS. 11A–11C are flow charts showing the operation of the controller section of the configuration assistant system.
Figure 11B:
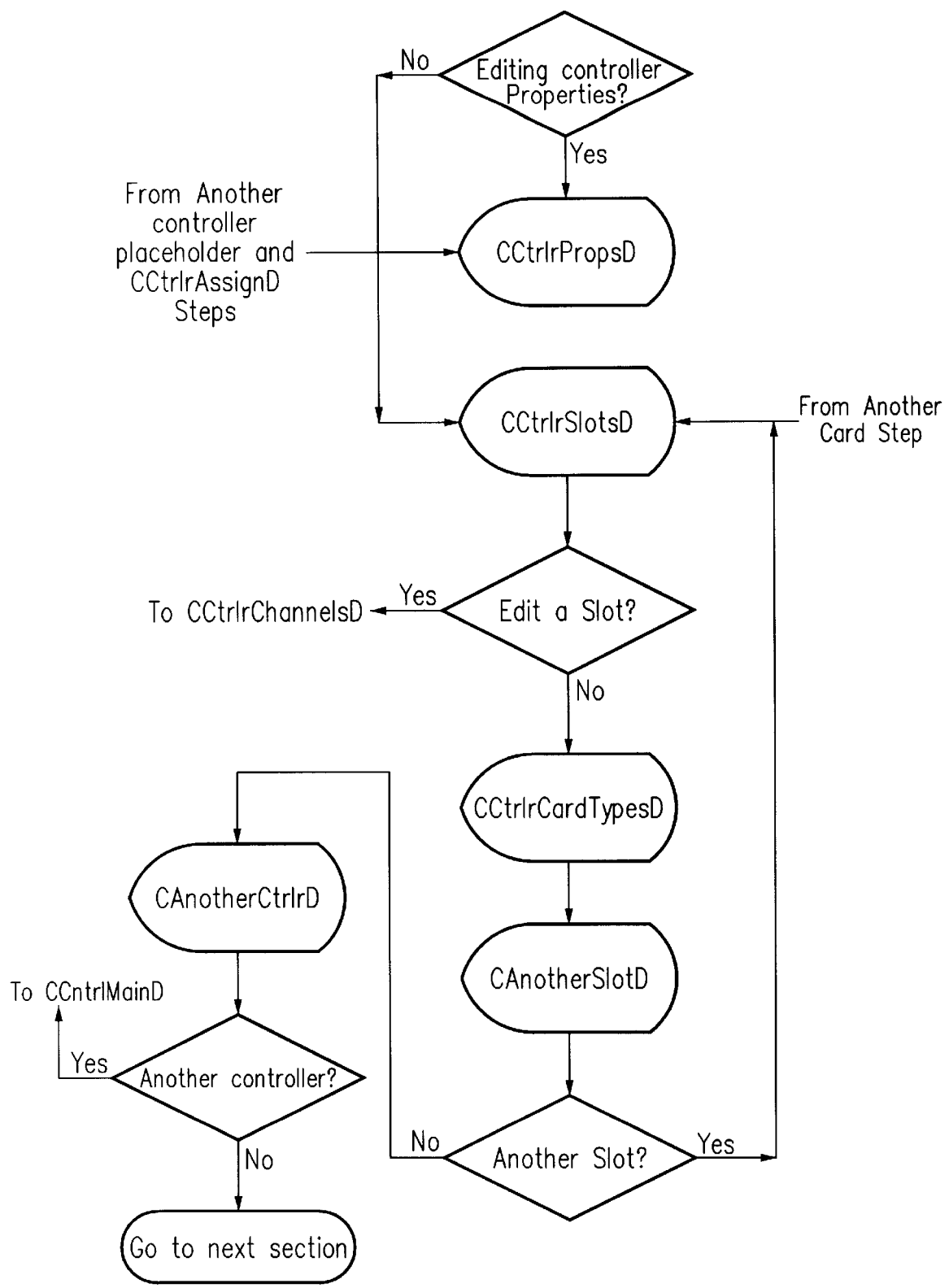
Figure 11C:
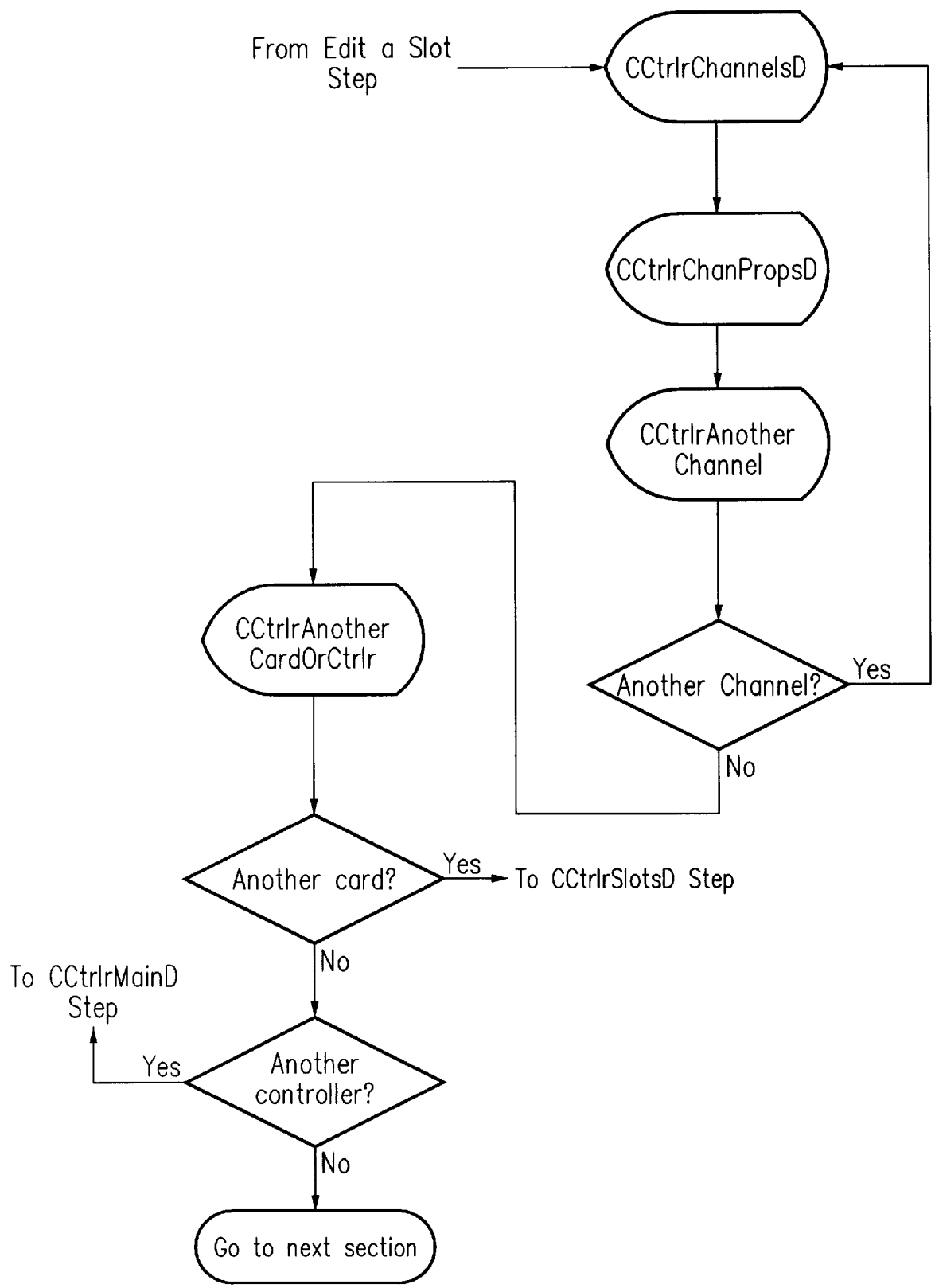
Figure 12A:
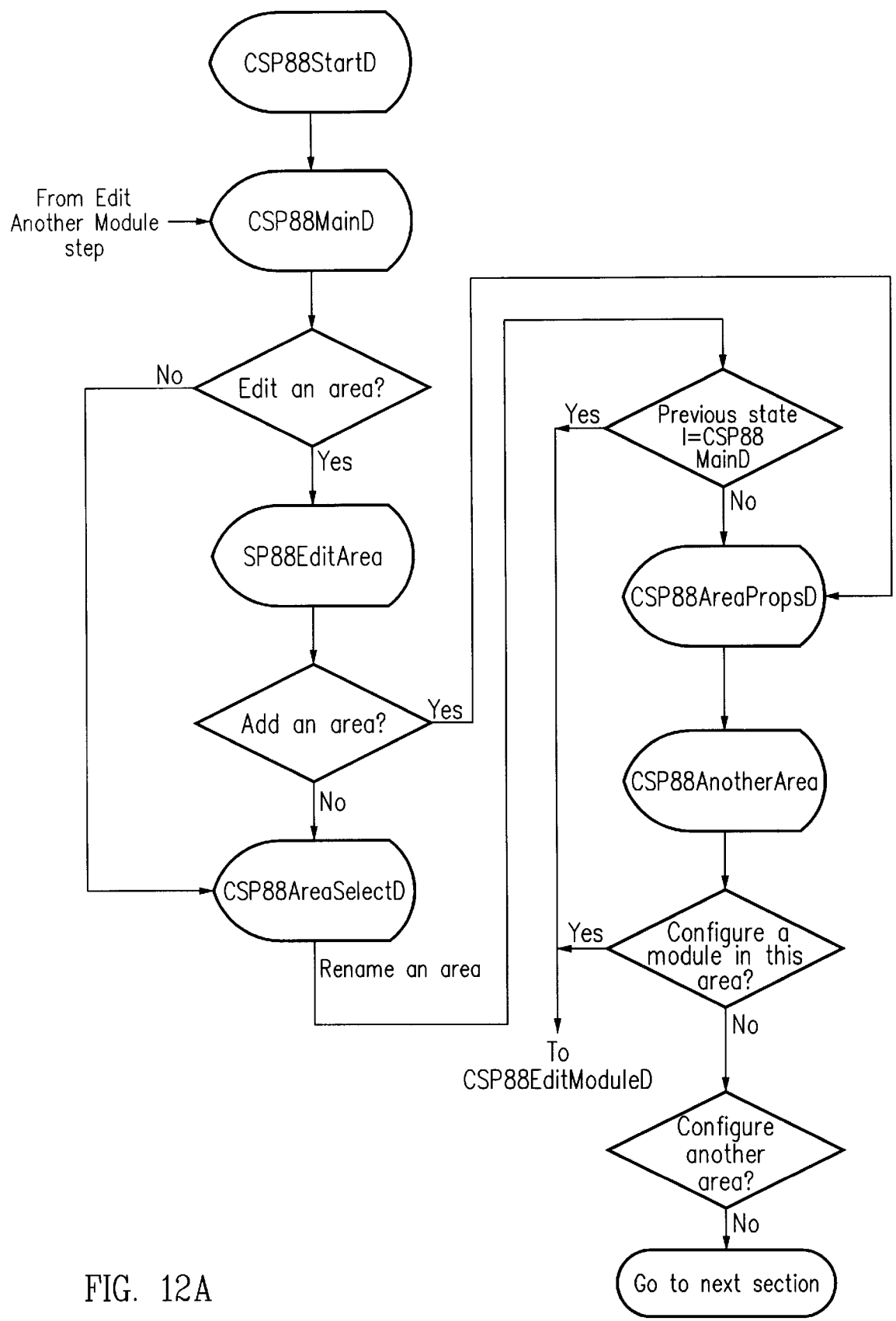
FIGS. 12A–12D are flow charts showing the operation of the controller hierarchy section of the configuration assistant system.
Figure 12B:
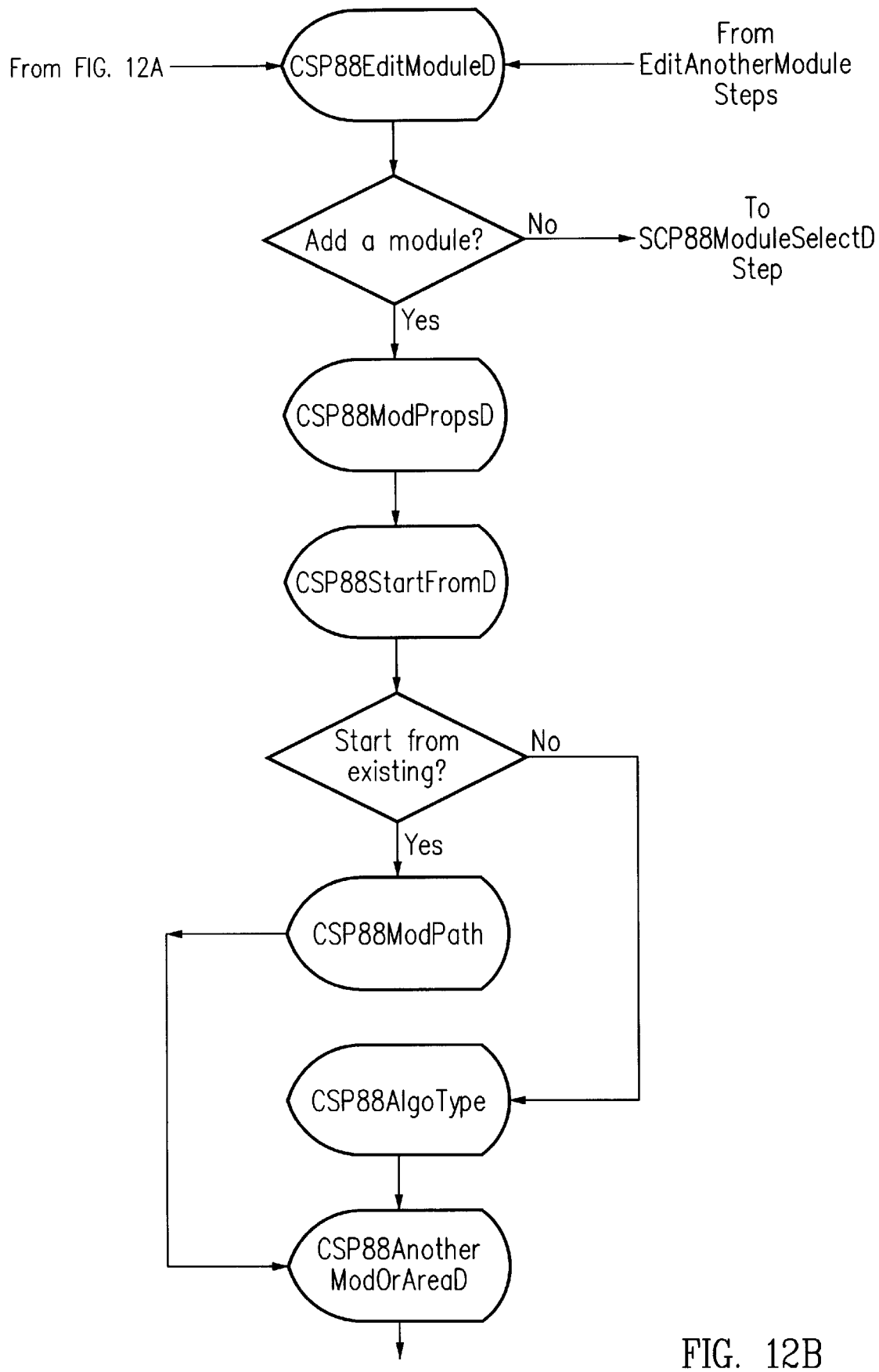
Figure 12C:
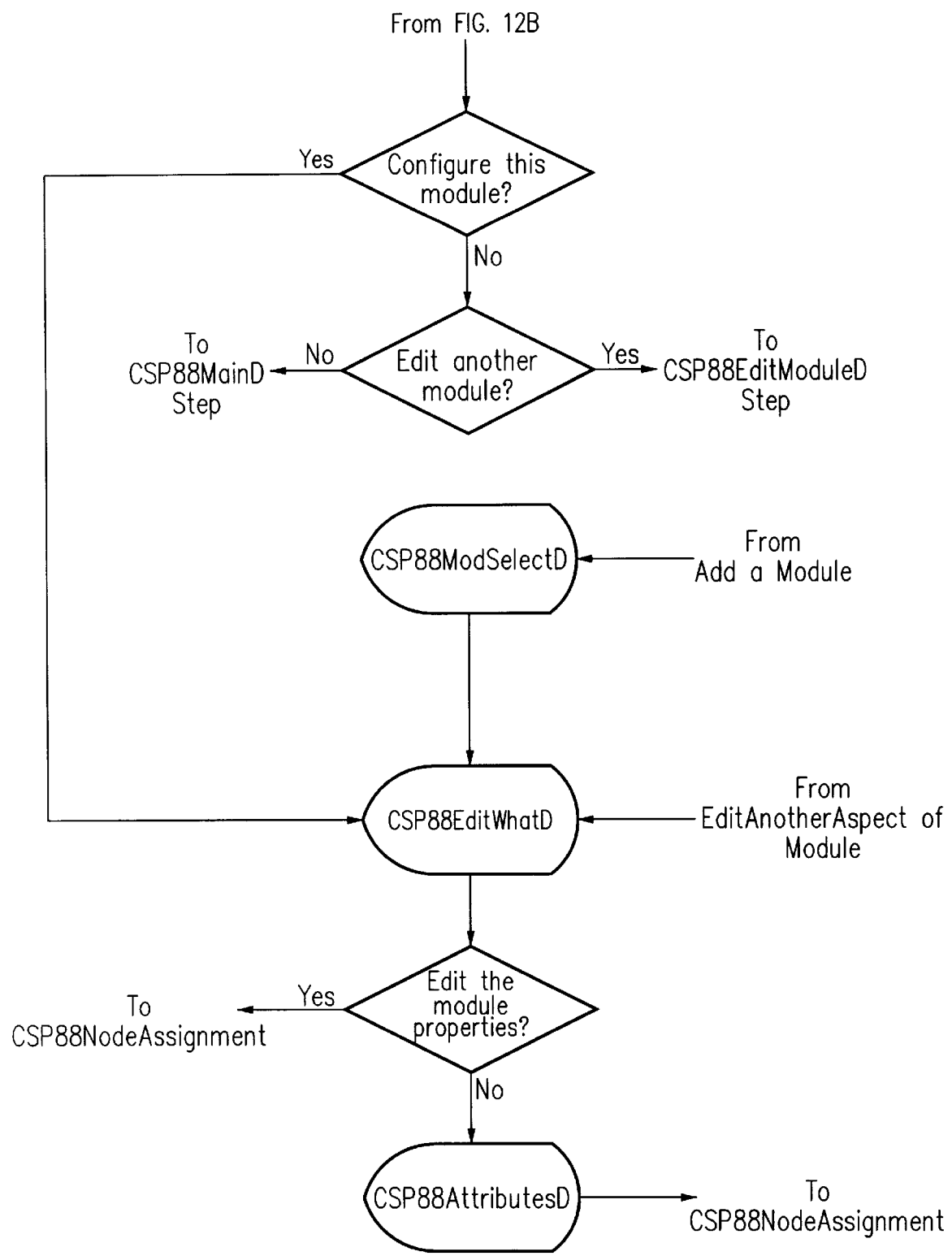
Figure 12D:
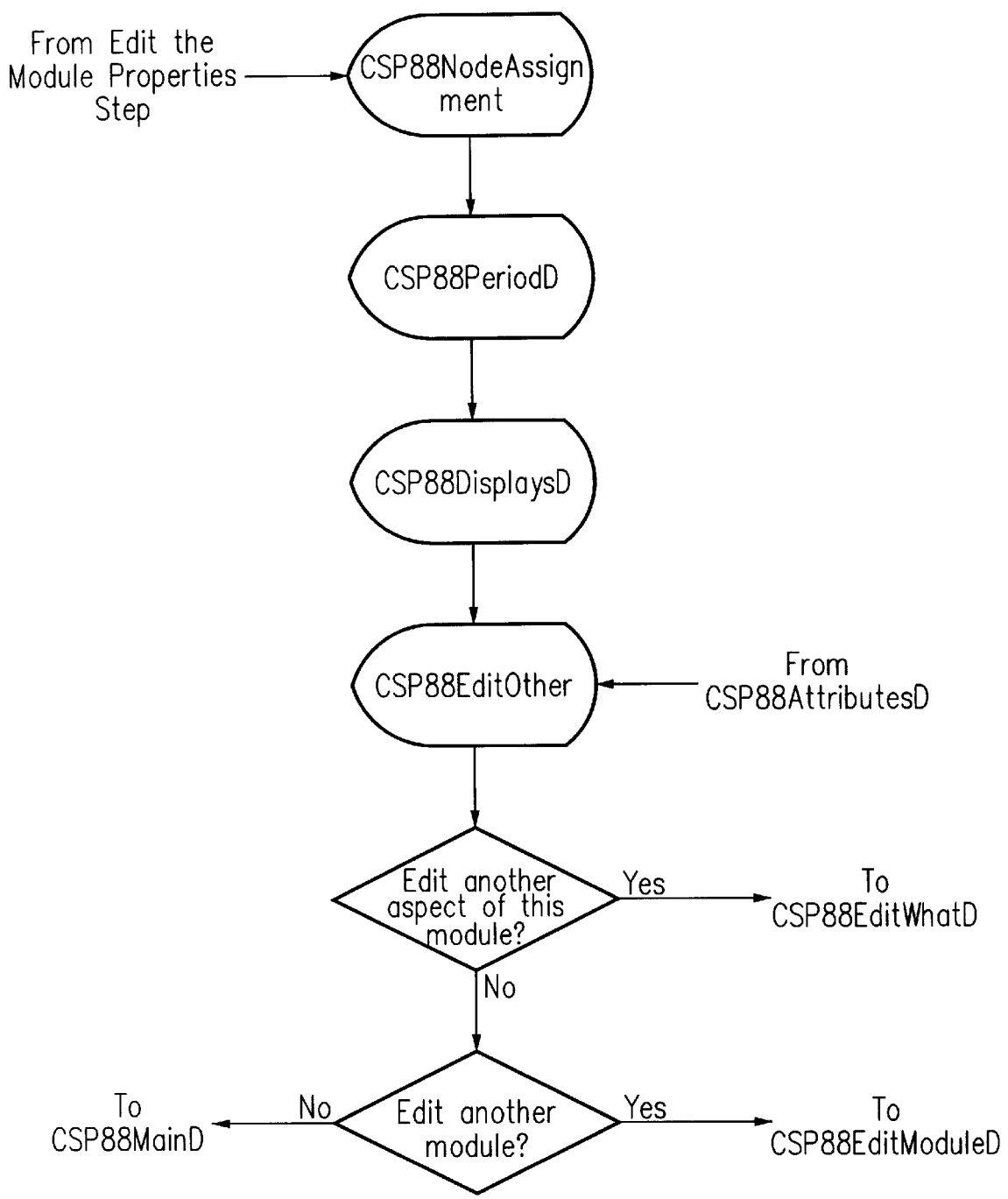
Figure 13A:
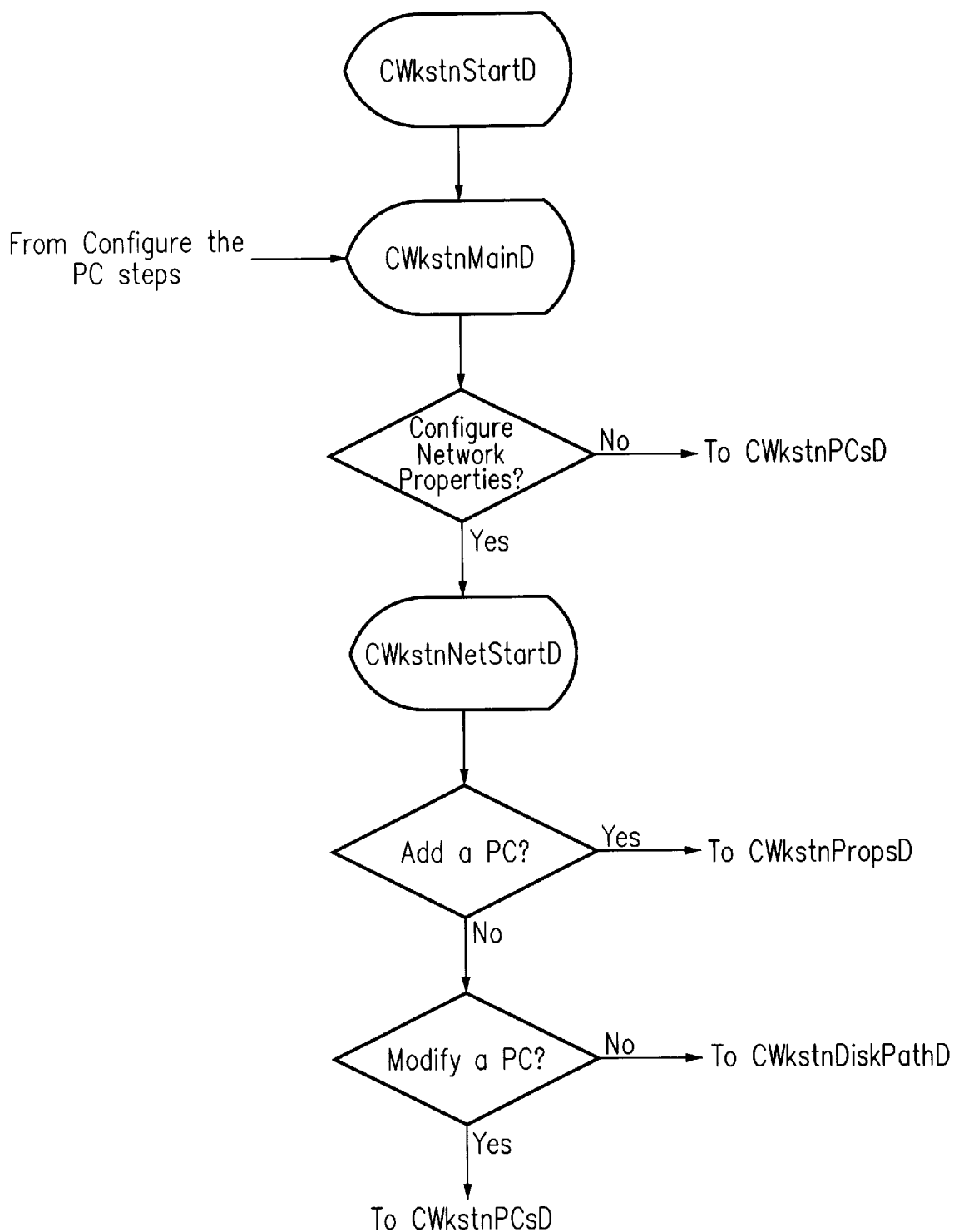
FIGS. 13A–13C are flow charts showing the operation of the workstation section of the configuration assistant system.
Figure 13B:
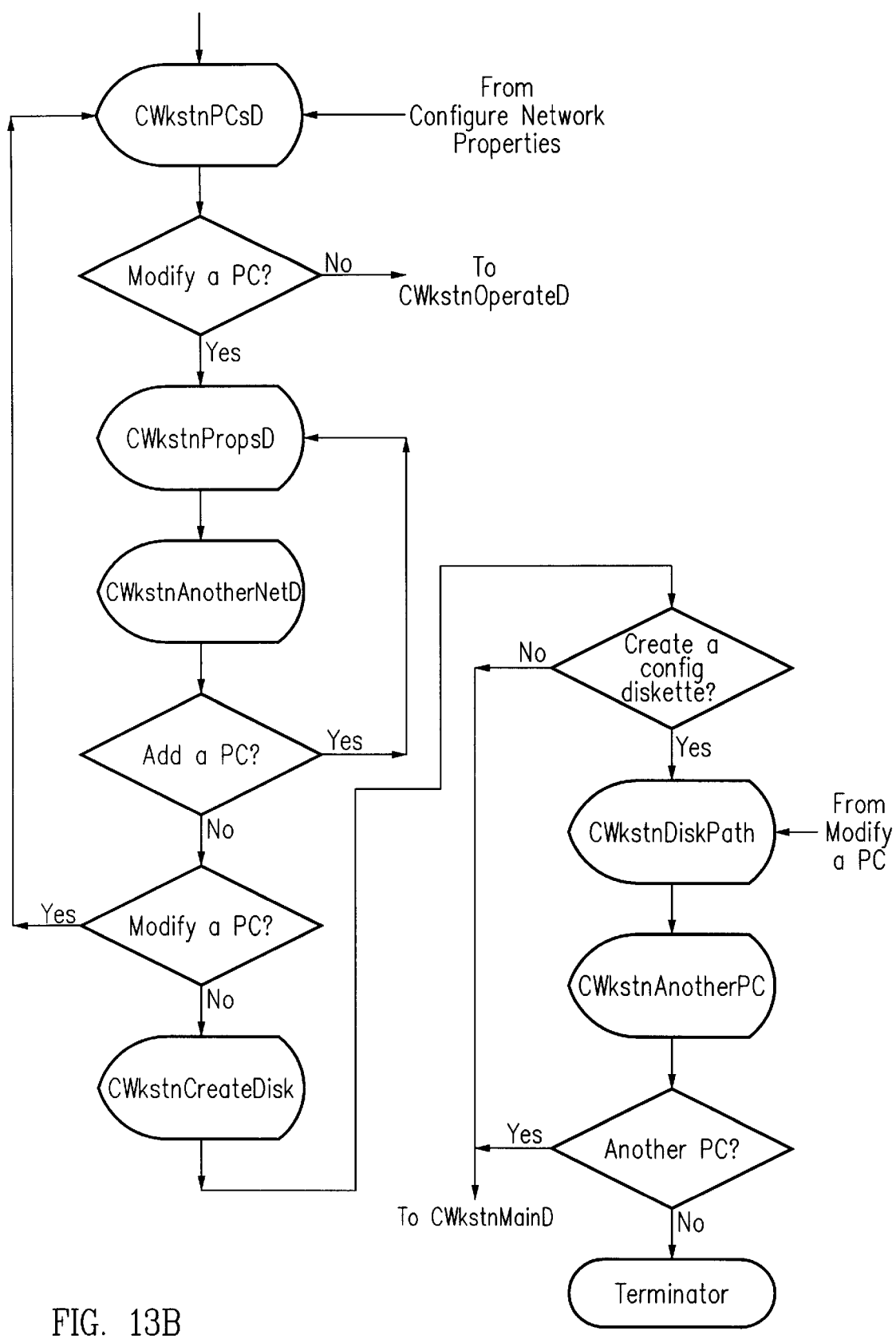
Figure 13C:
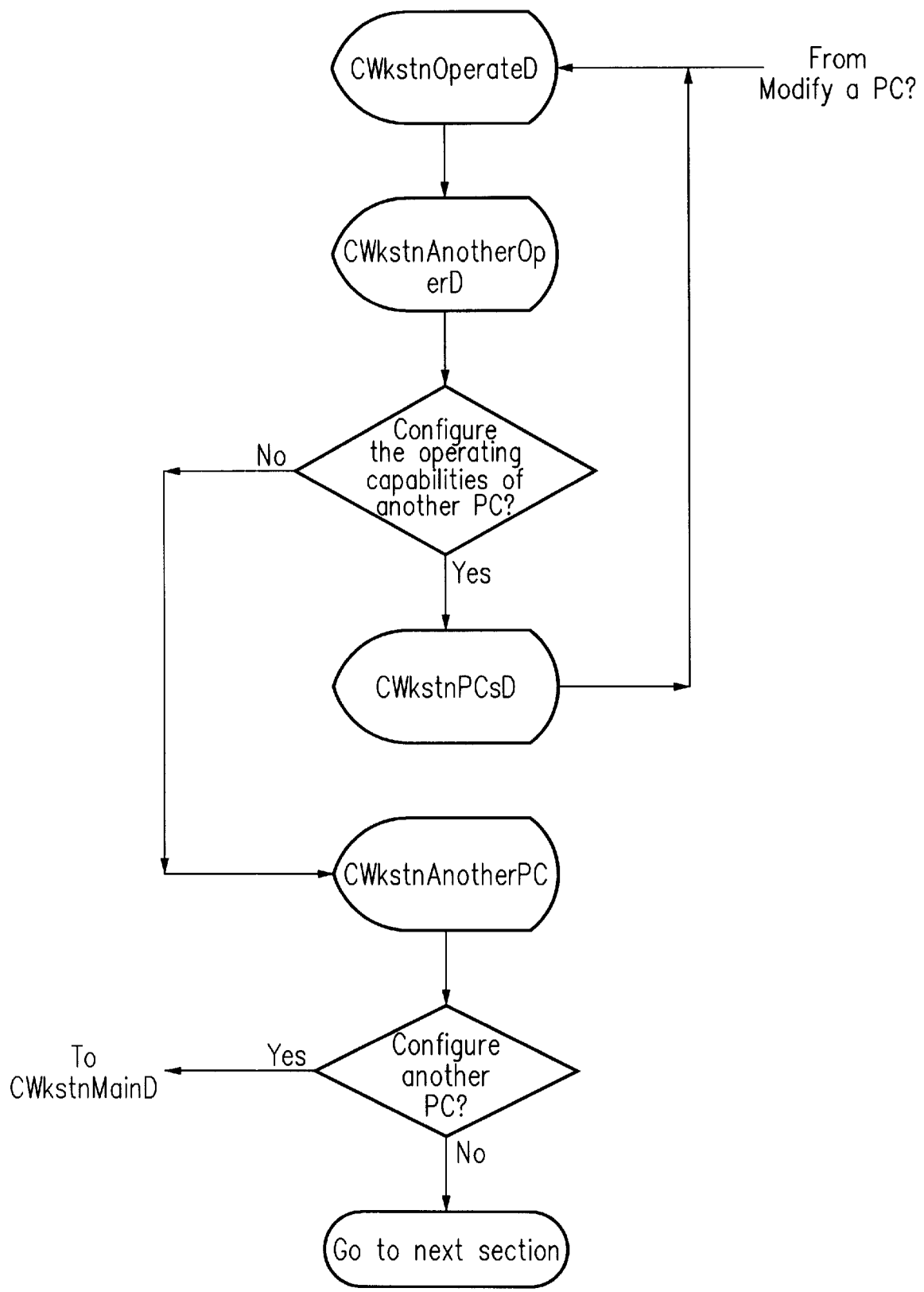
Figure 14:
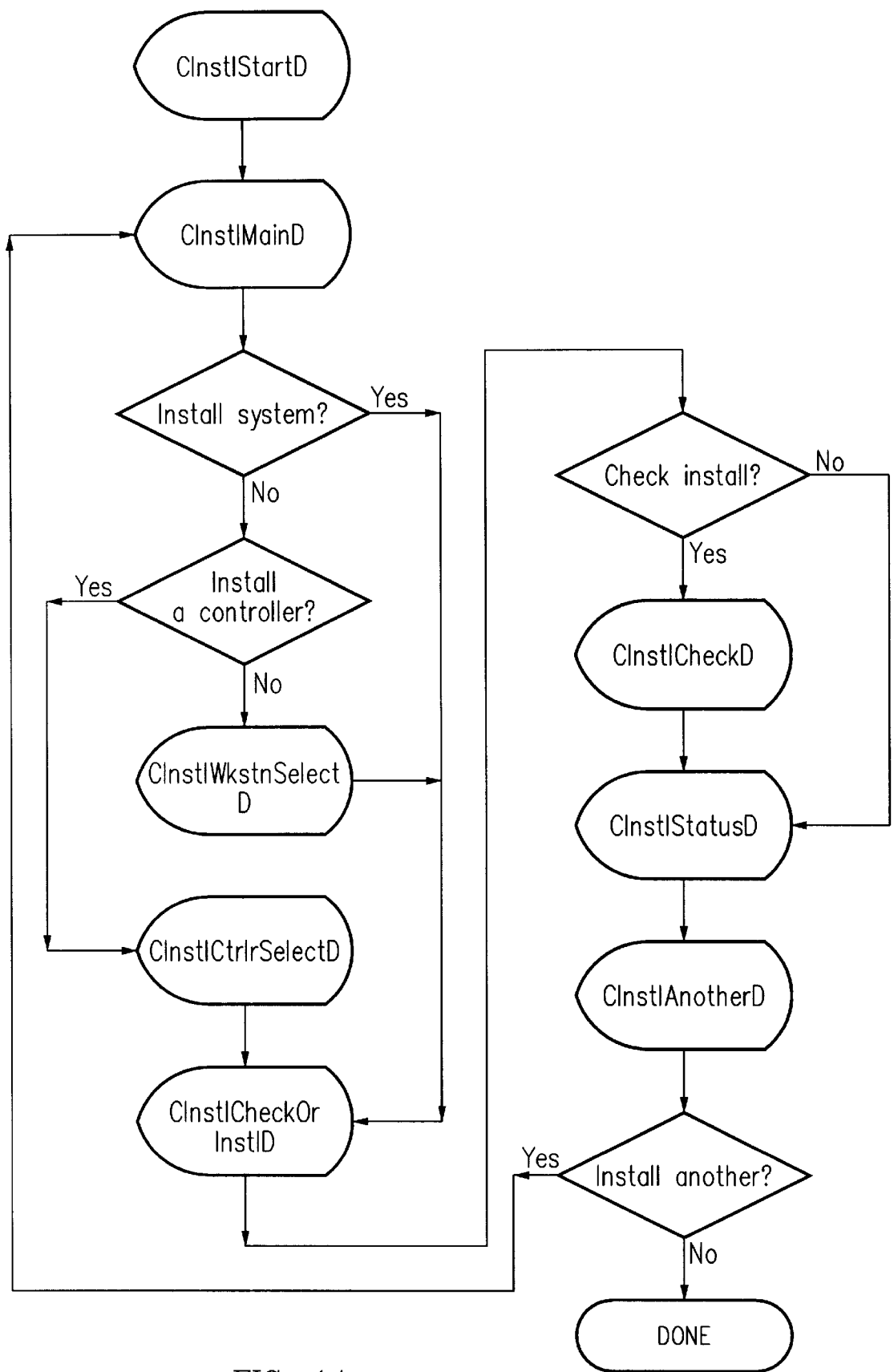
FIG. 14 is a flow chart showing the operations of the install section of the configuration assistance system.

Referring generally to FIGS. 10–14, the operation of configuration assistant system 130 is conceptually performed on a section by section basis. The access to a particular instructional section is controlled by the section class hierarchy portion of configuration assistant system 130. Specifically, FIG. 10 shows the operation of the instructional section, FIG. 11 shows the operation of the controller section, FIG. 12 shows the operation of the controller hierarchy section, FIG. 13 shows the operation of the workstation section, and FIG. 14 shows the operation of the install section.

More specifically, when configuration assistant system 130 is first accessed, a starting screen conforming to the start section of the configuration assistant system is displayed. This screen presentation conforms to the information layout. From this screen, a user may select another tab, 312–320, or the Next button 332. When another tab is selected, the next screen to be displayed is the starting screen for the selected tab. Alternately, when the Next button 332 is actuated, the next screen to be displayed is the starting screen for the Controllers section. The class which presents the dialog for the initial screen presentations is the CHcaDlg class.

Other alternatives from any screen presentation, including the starting screen presentation, include actuation of the Navigate button 336 and actuation of the tour button 338. When the navigate button is actuated, a navigate dialog screen presentation is presented. The users may then select a screen presentation from the list of screen presentations available. The configuration assistant system 130 then presents the selected screen presentation. The class which presents the dialog for the navigate dialog screen presentation is the CHcaDlg class.

The configuration assistant system includes a plurality of user edit node modes of operation. These user edit node modes of operation include moving a controller node from auto-sensed to configured and adding a controller node to the environment.

When moving a controller node from auto-sensed to configured, the user selects the controller tab 314 from the main screen presentation and actuates the next button 332. The configuration assistant system 130 then causes a controller main choice screen presentation to be presented; the controller main choice screen presentation conforms to the Choice screen layout. The choices presented include: assign an existing controller; add a controller placeholder; configure a controller's properties; and, configure a controllers I/O. The user then actuates the assign existing controller radio button and actuates the Next button 332. The configuration assistant system 130 then presents a controller assignment select screen presentation which conforms to the Choice screen layout and provides a list of auto-sensed controllers. The user then selects a controller from the list of auto-sensed controllers and actuates the next button 332. The configuration assistant system 130 then presents a controller properties data entry screen presentation which conforms to the Data Entry screen layout. The user then enters the controller properties including the Name and Description of the controller. If the user is not sure to which controller 110 he is referring, then the user actuates a flash button (not shown). Actuating the flash button causes the configuration assistant system 130 to cause the selected controller 110 to flash a light. The user then merely looks at the controllers of the environment 100 to determine which controller 110 has a blinking light. Actuating the flash button (not shown) also causes a light to flash within the picture of the controller, thus indicating to a user that the controller's actual light is flashing. Once the controller properties have been entered, then the next button is actuated, thus causing configuration assistant system 130 to present the controller main choice screen presentation. The classes which present the dialog for this function are CCtrlrMainD, CCtrlrAssignD, and CCtrlrPropsD.

When adding a controller node place holder to the environment, the user selects the controller tab 314 from the main screen presentation and actuates the next button 332. The configuration assistant system 130 then causes the controller main choice screen presentation to be presented. The user then actuates the add controller placeholder radio button and actuates the Next button 332. The configuration assistant system 130 then presents a controller properties data entry screen presentation which conforms to the Data Entry screen layout. The user then enters the controller properties including the Name and Description of the controller. Once the controller properties have been entered, then the next button is actuated, thus causing configuration assistant system 130 to present the controller main choice screen presentation. The classes which present the dialog for this function are CCtrlrMainD and CCtrlrPropsD.

The configuration assistant system 130 includes a plurality of user edit cards of a node modes of operation. These user edit cards of a node modes of operation include setting the properties of an auto-sensed card and adding a card to a node.

When setting the properties of an auto-sensed card, the user selects the controller tab 314 from the main screen presentation and actuates the next button 332. The configuration assistant system 130 then causes the controller main choice screen presentation to be presented. The user then actuates the configure controller I/O radio button and actuates the Next button 332. The configuration assistant system 130 then presents a controllers select screen presentation which conforms to the Choice screen layout and provides a list of configured controllers. The user then selects a controller from the list of configured controllers and actuates the next button 332. The configuration assistant system 130 then presents a slots select screen presentation which conforms to the Choice screen layout and provides a list of slots in the selected controller. The user then selects a slot with a card in it from the list of slots and actuates the next button 332. The configuration assistant system 130 then presents a channel properties data entry screen presentation which conforms to the Data Entry screen layout. The user then enters the channel properties including the channel type, the enabled/disabled status and the I/O tag of the card and actuates the next button 332. The configuration assistant system 130 then causes a continue choice screen presentation to be presented. The continue choice screen presentation asks the user whether he wishes to configure another channel. If the user selects yes, then the configure card select screen presentation is again presented. If the user select no, then the user is asked whether he wishes to configure another card on this controller or another controller or is done configuring controllers. If the user selects another card then the controller slots select screen presentation is presented. If the user selects another controller, then the controllers select screen presentation is presented. If the user select done with controllers, then the control hierarchy tab section of the configuration assistant system 130 is initiated. The classes which present the dialog for this function are CCtrlrMaind, CCtrlrSelectD, CCtrlrSlotsD, CCtrlrCardD, CChannelPropsD, CAnothehrCardOrChannelD, and CAnotherControllerD.

When adding a card to a node, the user selects the controller tab 314 from the main screen presentation and actuates the next button 332. The configuration assistant system 130 then causes the controller main choice screen presentation to be presented. The user then actuates the configure controller I/O radio button and actuates the Next button 332. The configuration assistant system 130 then presents a controllers select screen presentation which conforms to the Choice screen layout and provides a list of configured controllers. The user then selects a controller from the list of configured controllers and actuates the next button 332. The configuration assistant system 130 then presents a slots select screen presentation which conforms to the Choice screen layout and provides a list of slots in the selected controller. The user then selects an empty slot from the list of slots, selects a configure slot radio button and actuates the next button 332. The configuration assistant system 130 then presents a configure slot screen presentation which conforms to the Choice screen layout and provides a list of card types. The user then selects a card type from the list of card types and actuates the next button 332. The configuration assistant system 130 then causes a continue choice screen preston to be presented. The continue choice screen presentation asks the user whether he wishes to configure another slot. If the user selects yes, then the controller slots select screen presentation is again presented. If the user select no, then the user is asked whether he wishes to configure another controller or is done configuring controllers. If the user selects another controller, then the controllers select screen presentation is presented. If the user select done with controllers, then the control hierarchy section of the configuration assistant system 130 is initiated. The classes which present the dialog for this function are CCtrlrMaind, CCtrlrSelectD, CCtrlrSlotsD, CCtrlrCardD, and CAnotherControllerD.

The configuration assistant system 130 includes a plurality of user edit areas modes of operation. These user edit areas modes of operation include adding an area and renaming an area.

When adding an area, the user selects the control hierarchy tab 316 from the main screen presentation and actuates the next button 332. The configuration assistant system 130 then causes a control hierarchy main choice screen presentation to be presented; the control hierarchy main choice screen presentation conforms to the Choice screen layout. The control hierarchy main choice screen choices include edit an area and edit the modules in an area. The user then actuates the edit an area radio button and actuates the Next button 332. The configuration assistant system 130 then presents a areas choice select screen presentation which conforms to the Choice screen layout and provides the options of add an area or rename an area. The user then selects the add an area choice and actuates the next button 332. The configuration assistant system 130 then presents an area properties data entry screen presentation which conforms to the Data Entry screen layout. The user then enters the area properties including the Name and Description of the area. Once the area properties have been entered, then the next button is actuated. The configuration assistant system 130 then presents a choice screen presentation. The choices are configure modules for this area, configure another area and done configuring areas. The user select the done configuring areas choice and actuates the next button thus causing the configuration assistant system 130 to present the control hierarchy main choice screen presentation. The classes which present the dialog for this function are CSP88MainD, CSP88EditAreaD, CSP88AreaPropsD and CSP88AnotherAreaD.

When renaming an area, the user selects the control hierarchy tab 316 from the main screen presentation and actuates the next button 332. The configuration assistant system 130 then causes a control hierarchy main choice screen presentation to be presented; the control hierarchy main choice screen presentation conforms to the Choice screen layout. The control hierarchy main choice screen choices include edit an area and edit the modules in an area. The user then actuates the edit an area radio button and actuates the Next button 332. The configuration assistant system 130 then presents a areas choice select screen presentation which conforms to the Choice screen layout and provides the options of add an area or rename an area. The user then selects the rename an area choice and actuates the next button 332. The configuration assistant system 130 then presents an area properties data entry screen presentation which conforms to the Data Entry screen layout and includes an area name in the name field. The user then enters a new name in the name field of the area properties. Once the name has been entered, then the next button is actuated. The configuration assistant system 130 then presents a choice screen presentation. The choices are configure modules for this area, configure another area and done configuring areas. The user select the done configuring areas choice and actuates the next button thus causing the configuration assistant system 130 to present the control hierarchy main choice screen presentation. The classes which present the dialog for this function are CSP88MainD, CSP88EditAreaD, CSP88AresPropsD and CSP88AnotherAreaD.

The configuration assistant system 130 includes a plurality of user edit modules modes of operation. These user edit modules modes of operation include adding a module to an area, editing the properties of a module and editing the attributes of a module and editing a module.

When adding a module to an area, the user selects the control hierarchy tab 316 from the main screen presentation and actuates the next button 332. The configuration assistant system 130 then causes the control hierarchy main choice screen presentation to be presented The user then actuates the edit the modules in an area radio button and actuates the Next button 332. The configuration assistant system 130 then presents an areas select screen presentation which conforms to the Select screen layout and provides a list of areas. The user then selects an area and actuates the next button 332. The configuration assistant system 130 then causes a module choice screen presentation to be presented; the choices presented are add a new module and modify a module. For adding a module, the user then actuates the add a new modules radio button and actuates the Next button 332. The configuration assistant system 130 then presents a series of data entry screen presentations conform to the Data Entry screen layout. The user then enters properties including the Name and Description of the module, create from scratch or from a library module and function block or SFC algorithm. After the data has been entered, a choice screen is presented asking whether the user wishes to configure the module, modify a different module in this area or done configuring modules in this area. The user selects the done configuring modules choice and actuates the next button thus causing the configuration assistant system 130 to present the control hierarchy main choice screen presentation. The classes which present the dialog for this function are CSP88MainD, CSP88EditModuleD, CSP88ModPropsD, CSP88StartFromD and CSP88AlgoTypeD.

When editing the properties of a module, the user selects the control hierarchy tab 316 from the main screen presentation and actuates the next button 332. The configuration assistant system 130 then causes the control hierarchy main choice screen presentation to be presented The user then actuates the edit the modules in an area radio button and actuates the Next button 332. The configuration assistant system 130 then presents an areas select screen presentation which conforms to the Select screen layout and provides a list of areas. The user then selects an area and actuates the next button 332. The configuration assistant system 130 then causes a module choice screen presentation to be presented; the choices presented are add a new module and modify a module. For editing the properties of a module, the user then actuates the modify a modules radio button and actuates the Next button 332. The configuration assistant system 130 then presents a select screen which lists the modules for the current area. The user then selects the module to be edited and actuates the next button 332. The configuration assistant system 130 then presents a choice screen presentation, the choices are edit the properties or edit the configuration view. For editing the properties of a module, the user actuates the edit the properties radio button and actuates the Next button 332. The configuration assistant system 130 then presents a series of data entry screen presentations conforming to the Data Entry screen layout. The user then enters properties including the Node assignment, execution period and priority, and primary, detail and instrument displays. After the data has been entered, a choice screen is presented asking whether the user wishes to configure the attributes of the module, configure another module in this area, configure another area or done configuring modules in this area. The user selects the done configuring modules choice and actuates the next button thus causing the configuration assistant system 130 to present the control hierarchy main choice screen presentation. The classes which present the dialog for this function are CSP88MainD, CSP88EditModuleD, CSP88EditOtherD, CSP88NodeAssigmentD, CSP88PeriodD and CSP88DisplaysD.

When editing the attributes of a module, the user selects the control hierarchy tab 316 from the main screen presentation and actuates the next button 332. The configuration assistant system 130 then causes the control hierarchy main choice screen presentation to be presented. The user then actuates the edit the modules in an area radio button and actuates the Next button 332. The configuration assistant system 130 then presents an areas select screen presentation which conforms to the Select screen layout and provides a list of areas. The user then selects an area and actuates the next button 332. The configuration assistant system 130 then causes a module choice screen presentation to be presented; the choices presented are add a new module and modify a module. For editing the attributes of a module, the user then actuates the modify a modules radio button and actuates the Next button 332. The configuration assistant system 130 then presents a select screen which lists the modules for the current area. The user then selects the module to be edited and actuates the next button 332. The configuration assistant system 130 the presents a choice screen presentation, the choices are edit the properties or edit the configuration view. For editing the attributes of a module, the user actuates the edit the configuration view radio button and actuates the Next button 332. The configuration assistant system 130 then presents an attributes select screen presentation. The user selects an attribute and actuates an edit attribute button (not shown). An attribute properties dialog is presented thus allowing the user to edit the attribute. After the data has been entered, a choice screen is presented asking whether the user wishes to configure the attributes of the module, configure another module in this area, configure another area or done configuring modules in this area. The user selects the done configuring modules choice and actuates the next button thus causing the configuration assistant system 130 to present the control hierarchy main choice screen presentation. The classes which present the dialog for this function are CSP88MainD, CSP88EditModuleD, CSP88EditOtherD, CSP88Attributes.

When editing a module, the user selects the control hierarchy tab 316 from the main screen presentation and actuates the next button 332. The configuration assistant system 130 then causes the control hierarchy main choice screen presentation to be presented. The user then actuates the edit the modules in an area radio button and actuates the Next button 332. The configuration assistant system 130 then presents an areas select screen presentation which conforms to the Select screen layout and provides a list of areas. The user then selects an area and actuates the next button 332. The configuration assistant system 130 then causes a module choice screen presentation to be presented; the choices presented are add a new module and modify a module. For editing a module, the user then actuates the modify a modules radio button and actuates the Next button 332. The configuration assistant system 130 then presents a select screen which lists the modules for the current area. The user then selects the module to be edited and actuates the next button 332. The configuration assistant system 130 the presents a choice screen presentation, the choices are edit the properties or edit the configuration view. For editing a module, the user actuates a edit algorithm button (see FIG. 3B). The configuration assistant system 130 then causes a Control Studio system to be executed. The Control Studio system is discussed in more detail in cofiled application entitled in the application to Dove et al. entitled "System for Configuring a Process Control Environment" having attorney docket number M-3927, which application is hereby incorporated by reference in its entirety. After the module has been edited, control returns from the control studio system and a choice screen is presented asking whether the user wishes to configure the attributes of the module, configure another module in this area, configure another area or done configuring modules in this area. The user selects the done configuring modules choice and actuates the next button thus causing the configuration assistant system 130 to present the control hierarchy main choice screen presentation. The classes which present the dialog for this function are CSP88MainD, CSP88EditModuleD and CSP88EditOtherD.

The configuration assistant system 130 includes a plurality of user edit workstations modes of operation. These user edit workstation modes of operation include adding a workstation node to the system, modifying a workstation node in the system, creating a configuration diskette and configuring the operating capabilities of the workstation.

When adding a workstation node to the system, the user selects the workstation tab 318 from the main screen presentation and actuates the next button 332. The configuration assistant system 130 then causes a choice screen presentation to be presented. The choices presented are configure network properties and configure operating capabilities. The user then actuates the configure network properties radio button and actuates the Next button 332. The configuration assistant system 130 then causes a choice screen presentation to be presented. The choices presented are add a workstation, modify a workstation, and create a configuration diskette. The user then actuates add a workstation radio button and actuates the Next button 332. The configuration assistant system 130 then presents the workstation properties data entry screen The user then enters properties including the Name and Description of the workstation and actuates the Next button 332. After the data has been entered, a choice screen is presented asking whether the user wishes to add a workstation, modify a workstation or is done adding and modifying workstations in the system. The user selects the done adding and modifying choice and actuates the next button thus causing the configuration assistant system 130 to present the control hierarchy main choice screen presentation. The classes which present the dialog for this function are CWkstnStartD, CWkstnMainD, CWkstnNetworkD, CWkstnPropsd, and CWks therD.

When modifying a workstation node in the system, the user selects the workstation tab 318 from the main screen presentation and actuates the next button 332. The configuration assistant system 130 then causes a choice screen presentation to be presented. The choices presented are configure network properties and configure operating capabilities. The user then actuates the configure network properties radio button and actuates the Next button 332. The configuration assistant system 130 then causes a choice screen presentation to be presented. The choices presented are add a workstation, modify a workstation, and create a configuration diskette. The user then actuates modify a workstation radio button and actuates the Next button 332. The configuration assistant system 130 then presents the workstation select screen which lists the workstations in the system. The user then selects the workstation to be modified and actuates the next button 332. The configuration assistant system 130 then presents the workstation properties data entry screen. The user then enters properties including the Name and Description of the workstation and actuates the Next button 332. After the data has been entered, a choice screen is presented asking whether the user wishes to add a workstation, modify a workstation or is done adding and modifying workstations in the system. The user selects the done adding and modifying choice and actuates the next button thus causing the configuration assistant system 130 to present the control hierarchy main choice screen presentation. The classes which present the dialog for this function are CWkstnStartD, CWkstnMainD, CWkstnNetworkD, CWkstnSelectD, CWkstnPropsD, and CWksAnotherD.

When creating a configuration diskette, the user selects the workstation tab 318 from the main screen presentation and actuates the next button 332. The configuration assistant system 130 then causes a choice screen presentation to be presented. The choices presented are configure network properties and configure operating capabilities. The user then actuates the configure network properties radio button and actuates the Next button 332. The configuration assistant system 130 then causes a choice screen presentation to be presented. The choices presented are add a workstation, modify a workstation, and create a configuration diskette. The user then actuates create a configuration diskette radio button and actuates the Next button 332. The configuration assistant system 130 then presents the configuration diskette data entry screen. The user then enters a path to the configuration diskette and actuates the Next button 332. After the data has been entered, the configuration file is written to the path, and a choice screen is presented asking whether the user wishes to add or modify a workstation or define the operational capabilities of workstations in the system. The classes which present the dialog for this function are CWkstnStartD, CWkstnMainD, CWkstnNetworkD, CWkstnDiskD, and CWkstnAnotherD.

When configuring the operating capabilities of a workstation, the user selects the workstation tab 318 from the main screen presentation and actuates the next button 332. The configuration assistant system 130 then causes a choice screen presentation to be presented. The choices presented are configure network properties and configure operating capabilities. The user then actuates the configure operating capabilities radio button and actuates the Next button 332. The configuration assistant system 130 then causes the workstation select screen to appear. The user then selects a workstation and actuates the next button 332. The configuration assistant system 130 then causes the operate areas select screen presentation to be presented, which lists all areas available from which to operate. The user then selects the areas from which the selected workstation can operate from the list of all areas and actuates the Next button 332. The configuration assistant system 130 then causes a choice screen presentation to be presented. The choice presented is whether the user wishes to configure another workstation. The user then selects no and actuates the Next button 332. The configuration assistant system 130 then causes a choice screen presentation to be presented. The choices are whether the user wishes to add or modify another PC, i.e., workstation or define the operational capabilities of PC's. Control then transitions to the next section. The classes which present the dialog for this function are CWkstnStartD, CWkstnMainD, CWkostiNetworkD, CWkstnDiskD, and CWkstnAnotherD.

The configuration assistant system 130 includes a single user installation mode of operation. When installing a controller on the system, the user selects the install tab 320 from the main screen presentation and actuates the next button 332. The configuration assistant system 130 then causes a choice screen presentation to be presented. The choices presented are install the system, install a workstation and install a controller. The user then actuates the install a controller radio button and actuates the Next button 332. The configuration assistant system 130 then causes a controller select screen presentation to be presented. The user then selects a controller, and actuates the Next button 332. The configuration assistant system 130 then causes a choice screen presentation to be presented. The choices presented are check the configuration and go ahead and install the controller. The user then actuates the check the configuration radio button and actuates the Next button 332. The configuration assistant system 130 then initiates a series of checks to verify nothing is missing. For each check that fails, and informational screen which describes the problem is displayed. Included in the screen is a fix it button. If the user selects the fixit button, the configuration assistant system 130 will display the screen most likely to fix the problem, if the information requested by the screen is correctly entered by the user. After presenting the informational check screens, the configuration assistant system 130 automatically installs the configuration and presents an install status screen. After the installation is complete the configuration assistant system 130 causes a choice screen presentation to be presented. The choices presented are install another node and done with installation. The user selects the done installing choice and actuates the next button thus causing the configuration assistant system 130 to present the control hierarchy main choice screen presentation. The classes which present the dialog for this function are CInstlStartD, CInstlMainD, CInstlCheckOrInstlID, CInstlCheckD, CInstlStatusD, and CInstlAnotherD.

Other Embodiments

Other embodiments are within the following claims.

More specifically, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention, including but not limited to implementations in other programming languages. Additionally, while the preferred embodiment is disclosed as a software implementation, it will be appreciated that hardware implementations such as application specific integrated circuit implementations are also within the scope of the following claims.

What is claimed is:

1. A method for configuring a process control environment, the process control environment including a computer system having a processor coupled to a display device, the method comprising:

providing a plurality of instructional sections, the instructional sections setting forth information relating to configuring a process control environment;

presenting, on the display device, a sequence of configuration screen presentations relating to the instruction sections;

guiding a user through the configuration of the process control environment via a question and answer session conducted via the sequence of configuration screen presentations, and configuring the system based upon responses from the user to the question and answer session.

2. The method of claim 1 wherein the plurality of instructional sections include an introduction instructional section, the introduction instructional section providing the user with introductory information relating to the configuration of the process control environment.

3. The method of claim 1 wherein the plurality of instructional sections include a controller instructional section, the controller instructional section providing a sequence of screen presentations for guiding the user through the process of configuring controllers within the process control environment.

4. The method of claim 1 wherein the plurality of instructional sections include a controller hierarchy instructional section, the controller hierarchy section providing a sequence of screen presentations for guiding the user through the process of configuring a controller hierarchy within the process control environment.

5. The method of claim 1 wherein the plurality of instructional sections include a workstation instructional section, the workstation instructional section providing a sequence of screen presentations for guiding the user through the process of configuring a workstation within the process control environment.

6. The method of claim 1 wherein the instructional sections are implemented using an object oriented framework.

7. The method of claim 6 wherein the object oriented framework includes classes; and the instructional sections include classes derived from a set of commercially available foundation classes.

8. The method of claim 1 wherein the configuration of the process control environment is stored within a database, the database including information relating to the process control environment; and the database is continuously updated as the user is guided through the configuration process.

9. The method of claim 1 wherein the configuration of the process control environment is reflected within an explorer portion of the process control environment.

10. The method of claim 1 wherein the sequence of screen presentations has an order, the order being determined by the question and answer session.

11. The method of claim 1 wherein the guiding the user includes presenting, on the display device, a configuration screen presentation including a textual question, wherein an answer to the question provided by the user determines which of the sequence of configuration screen presentations is presented next on the display device.

12. A system for configuring a process control environment, the system comprising:

a computer including a process coupled to a memory and a display device coupled to the processor;

a plurality of instructional sections stored in the memory, the instructional sections setting forth information relating to configuring the process control environment;

means for presenting, on the display device, a sequence of configuration screen presentations relating to the instruction sections;

means for guiding a user through the configuration of the process control environment via a question and answer session conducted via the sequence of configuration screen presentations, and means for configuring the system based upon responses from the user to the question and answer session.

13. The system of claim 12 wherein the plurality of instructional sections include an introduction instructional section, the introduction instructional section providing the user with introductory information relating to the configuration of the process control environment.

14. The system of claim 12 wherein the plurality of instructional sections include a controller instructional section, the controller instructional section providing a sequence of screen presentations for guiding the user through the process of configuring controllers within the process control environment.

15. The system of claim 12 wherein the plurality of instructional sections include a controller hierarchy instructional section, the controller hierarchy section providing a sequence of screen presentations for guiding the user through the process of configuring a controller hierarchy within the process control environment.

16. The system of claim 12 wherein the plurality of instructional sections include a workstation instructional section, the workstation instructional section providing a sequence of screen presentations for guiding the user through the process of configuring a workstation within the process control environment.

17. The system of claim 12 wherein the instructional sections are implemented in software.

18. The system of claim 17 wherein the software is implemented using an object oriented framework.

19. The system of claim 18 wherein the object oriented technology includes classes; and the instructional sections include classes derived from a set of commercially available foundation classes.

20. The system of claim 12 further comprising:

a database including information relating to the process control environment;

and wherein the database is continuously updated as the user is guided through the configuration process.

21. The system of claim 12 further comprising:

an explorer portion coupled to the processor; and wherein the configuration of the process control environment is reflected within the explorer portion of the process control environment.

22. The system of claim 12 wherein the sequence of screen presentations has an order, the order being determined by the question and answer session.

23. The method of claim 12 wherein the means for guiding the user includes means for presenting, on the display device, a configuration screen presentation including a textual question, wherein an answer to the question provided by the user determines which of the sequence of configuration screen presentations is presented next on the display device.

24. An article of manufacture comprising:
   a non-volatile memory;
   a plurality of instructional sections stored in the non-volatile memory, the instructional section setting forth information relating to configuring a process control environment;
   means for presenting, on a display device, a sequence of configuration screen presentations relating to the instruction sections, the means for presenting being stored in the non-volatile memory;
   means for guiding a user through the configuration of the process control environment via a question and answer session conducted via the sequence of configuration screen presentations, the means for guiding being stored in the non-volatile memory, and
   means for configuring the system based upon responses from the user to the question and answer session, the means for configuring being stored in the non-volatile memory.

25. The article of claim 24 wherein the sequence of screen presentations has an order, the order being determined by the question and answer session.

26. The method of claim 24 wherein the means for guiding the user includes means for presenting, on the display device, a configuration screen presentation including a textual question, wherein an answer to the question provided by the user determines which of the sequence of configuration screen presentations is presented next on the display device.

27. A method of configuring a process control environment, the process control environment including a computer system having a processor coupled to a display device, the method comprising:
   providing a plurality of instructional sections, the instructional sections setting forth information relating to configuring a process control environment;
   presenting, on the display device, a sequence of configuration screen presentations relating to the instruction sequence;
   guiding a user through the configuration of the process control environment via the sequence of configuration screen presentations;
   gathering information to configure the process control environment via a user dialog conducted via the sequence of screen presentations, and
   configuring the system based upon responses from the user to the question and answer session.

28. A method for configuring a process control environment, the process control environment including a computer system having a processor coupled to a display device, the method comprising:
   providing an object oriented framework, the object oriented framework including classes from a set of commercially available foundation classes and classes derived from a set of commercially available foundation classes;
   providing a plurality of instructional sections, the providing the plurality of instructional sections including using at least one instructional section class derived from the set of commercially available foundation classes, the at least one instructional section class including information relating to configuring a process control environment;
   presenting, on the display device, a sequence of configuration screen presentations relating to the instruction sections, the presenting including using at least one configuration screen presentation class derived from the set of commercially available foundation classes;
   guiding a user through the configuration of the process control environment via the sequence of configuration screen presentations, and
   configuring the system based upon responses from the user to the question and answer session.

29. The method of claim 28 wherein the plurality of instructional sections include an introduction instructional section, the introduction instructional section providing the user with introductory information relating to the configuration of the process control environment, the providing the introduction instructional section including using an introduction instructional section class.

30. The method of claim 28 wherein the plurality of instructional sections include a controller instructional section, the controller instructional section providing a sequence of screen presentations for guiding the user through the process of configuring controllers within the process control environment, the providing the controller instructional section including using a controller instructional section class.

31. The method of claim 28 wherein the plurality of instructional sections include a controller hierarchy instructional section, the controller hierarchy section providing a sequence of screen presentations for guiding the user through the process of configuring a controller hierarchy within the process control environment, the providing the controller hierarchy instructional section including using a controller hierarchy instructional section class.

32. The method of claim 28 wherein the plurality of instructional sections include a workstation instructional section, the workstation instructional section providing a sequence of screen presentations for guiding the user through the process of configuring a workstation within the process control environment, the providing the workstation instructional section including using a workstation instructional section class.

33. The method of claim 28 wherein the guiding the user through the configuration of the process control environment includes guiding the user via a question and answer session conducted via the sequence of configuration screen presentations.

34. The method of claim 28 wherein the configuration of the process control environment is stored within a database, the database including information relating to the process control environment; and
   the database is continuously updated as the user is guided through the configuration process.

35. The method of claim 28 wherein the configuration of the process control environment is reflected within an explorer portion of the process control environment.

36. The method of claim 28 wherein the at least one configuration screen presentation class is a dialog class.

37. A system for configuring a process control environment, the system comprising:
   a computer system including a processor coupled to a memory and a display device coupled to the processor;
   an object oriented framework stored in the memory, the object oriented framework including classes from a set of commercially available foundation classes and classes derived from the set of commercially available foundation classes, the object oriented framework including a plurality of instructional section classes derived from the set of commercially available foundation classes, the instructional section classes including information for providing a plurality of instructional sections setting forth information relating to configuring the process control environment;

means for presenting, on the display device, a sequence of configuration screen presentations relating to the instructional sections, the means for presenting using at least one configuration screen presentation class derived from the set of commercially available foundation classes;

means for guiding a user through the configuration of the process control environment via the sequence of configuration screen presentations, and means for configuring the system based upon responses from the user to the question and answer session.

38. The system of claim 37 wherein the plurality of instructional section classes include an introduction instructional section class, the introduction instructional section class including information for providing an introduction instructional section, the introduction instructional section providing the user with introductory information relating to the configuration of the process control environment.

39. The system of claim 37 wherein the plurality of instructional section classes include a controller instructional section class, the controller instructional section class including information for providing a controller instructional section, the controller instructional section providing a sequence of screen presentations for guiding the user through the process of configuring controllers within the process control environment.

40. The system of claim 37 wherein the plurality of instructional section classes include a controller hierarchy instructional section class, the controller hierarchy section class including information for providing a controller hierarchy section, the controller hierarchy section providing a sequence of screen presentations for guiding the user through the process of configuring a controller hierarchy within the process control environment.

41. The system of claim 37 wherein the plurality of instructional section classes include a workstation instructional section class, the workstation instructional section class including information for providing a workstation instructional section, the workstation instructional section providing a sequence of screen presentations for guiding the user through the process of configuring a workstation within the process control environment.

42. The system of claim 37 wherein the instructional sections are implemented in software.

43. The system of claim 37 further comprising:

a database including information relating to the process control environment; and wherein the database is continuously updated as the user is guided through the configuration process.

44. The system of claim 37 further comprising:

an explorer portion coupled to the processor; and wherein the configuration of the process control environment is reflected within the explorer portion of the process control environment.

45. The system of claim 37 wherein the means for guiding the user through the configuration of the process control environment includes means for guiding the user via a question and answer session conducted via the sequence of configuration screen presentations.

46. The method of claim 37 wherein the at least one configuration screen presentation class is a dialog class.

* * * * *

UNITED STATES PATENT AND TRADEMARK OFFICE
CERTIFICATE OF CORRRECTION

PATENT NO. : 5,940,294
DATED : August 17, 1999
INVENTOR(S) : Andrew P. Dove

Page 1 of 2

It is certified that error appears in the above-identified patent and that said Letters Patent is hereby corrected as shown below:

```
Title page item [56], insert the following:
```

U. S. PATENT DOCUMENTS

| EXAMINER INITIAL | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|
| | 5 | 0 | 0 | 6 | 9 | 9 | 2 | Apr. 9, 1991 | Skeirik | 364 | 513 | |
| | 5 | 3 | 1 | 1 | 5 | 6 | 2 | May 10, 1994 | Palusamy et al. | 376 | 215 | |
| | 4 | 9 | 1 | 6 | 6 | 1 | 0 | Apr. 10, 1990 | Bapat | 364 | 300 | |
| | 5 | 2 | 9 | 3 | 4 | 6 | 6 | Mar. 8, 1994 | Bringmann | 395 | 114 | |
| | 5 | 5 | 2 | 4 | 2 | 6 | 9 | Jun. 4, 1996 | Hamilton et al. | 395 | 829 | |
| | 5 | 0 | 6 | 3 | 5 | 2 | 3 | Nov. 5, 1991 | Vrenjak | 364 | 514 | |
| | 5 | 1 | 5 | 5 | 8 | 4 | 2 | Oct. 13, 1992 | Rubin | 395 | 575 | |
| | 5 | 5 | 1 | 9 | 8 | 7 | 8 | May 21, 1996 | Dolin, Jr. | 395 | 800 | |
| | 4 | 6 | 8 | 9 | 7 | 8 | 6 | Aug. 25, 1987 | Sidhu et al. | 370 | 94 | |

FOREIGN PATENT OR PUBLISHED FOREIGN PATENT APPLICATION

| | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | 0 | 5 | 2 | 2 | 5 | 9 | 0 | A 1 | 13.01.1993 | EP | | | | |
| | 2 | 2 | 0 | 8 | 5 | 5 | 3 | A | 05.04.1989 | GB | | | | |

UNITED STATES PATENT AND TRADEMARK OFFICE
CERTIFICATE OF CORRECTION

PATENT NO. : 5,940,294

DATED : August 17, 1999

INVENTOR(S) : Andrew P. Dove

Page 2 of 2

It is certified that error appears in the above-identified patent and that said Letters Patent is hereby corrected as shown below:

OTHER DOCUMENTS

PCT Foreign Search Report for international application, PCT US 98/01573 mailed November 11, 1998.

Signed and Sealed this

Eighteenth Day of July, 2000

Attest:

Q. TODD DICKINSON

*Attesting Officer*  *Director of Patents and Trademarks*